US011553656B2

(12) United States Patent
Song et al.

(10) Patent No.: US 11,553,656 B2
(45) Date of Patent: Jan. 17, 2023

(54) GARDENING APPARATUS

(71) Applicant: AVA Technologies Inc., Vancouver (CA)

(72) Inventors: Yo Wen Song, Vancouver (CA); Chase Arihiro Ando, Vancouver (CA); Michael Reza Nasseri, Vancouver (CA); Darshil Panagar, Burnaby (CA); Chiragh Dewan, Vancouver (CA)

(73) Assignee: AVA Technologies Inc., Vancouver (CA)

( * ) Notice: Subject to any disclaimer, the term of this patent is extended or adjusted under 35 U.S.C. 154(b) by 116 days.

(21) Appl. No.: 16/859,036

(22) Filed: Apr. 27, 2020

(65) Prior Publication Data

US 2020/0344965 A1 Nov. 5, 2020

Related U.S. Application Data

(60) Provisional application No. 62/840,889, filed on Apr. 30, 2019.

(51) Int. Cl.
*A01G 27/00* (2006.01)
*A01G 27/02* (2006.01)
(Continued)

(52) U.S. Cl.
CPC ........... *A01G 27/003* (2013.01); *A01G 7/045* (2013.01); *A01G 7/06* (2013.01); *A01G 27/008* (2013.01);
(Continued)

(58) Field of Classification Search
CPC .............................. A01G 27/003; A01G 27/02
See application file for complete search history.

(56) References Cited

U.S. PATENT DOCUMENTS

D181,348 S 11/1957 Dube
3,042,247 A 7/1962 Louis
(Continued)

FOREIGN PATENT DOCUMENTS

CA 1257093 A 7/1989
CA 2010332 A1 8/1990
(Continued)

OTHER PUBLICATIONS

International Search Report and Written Opinion dated Jul. 14, 2020 in connection with International Patent Application No. PCT/CA2020/050552, 11 pages.

*Primary Examiner* — Magdalena Topolski
*Assistant Examiner* — Katherine Anne Kloecker
(74) *Attorney, Agent, or Firm* — Dorsey & Whitney LLP

(57) ABSTRACT

A gardening apparatus includes one or more of a base, a fluid reservoir, and a plant tray or support disposed on the reservoir. The support is adapted for receiving one or more modular plant inserts, and can define a flow structure for channeling fluid to each insert. A pump supplies fluid from the reservoir to the plant tray or support, with a light assembly adapted to generate a spectrum of light for growth of plants from the inserts. A processor is configured for controlling fluid flow from the pump, the light spectrum generated by the lighting elements, or both. For example, the processor can use a dynamic recipe, algorithm or control schedule to modulate the fluid flow or spectrum based the plant type, growth stage, height, plant health data, digital phenotyping data, or ambient conditions, or a combination thereof.

35 Claims, 11 Drawing Sheets

(51) Int. Cl.
  *A01G 7/04* (2006.01)
  *G06V 20/10* (2022.01)
  *A01G 7/06* (2006.01)
  *H05B 47/105* (2020.01)
  *G06T 7/00* (2017.01)
  *H05B 47/16* (2020.01)

(52) U.S. Cl.
  CPC ............ *A01G 27/02* (2013.01); *G06T 7/0014* (2013.01); *G06V 20/10* (2022.01); *G06V 20/188* (2022.01); *H05B 47/105* (2020.01); *H05B 47/16* (2020.01); *G06T 2207/10016* (2013.01); *G06T 2207/30188* (2013.01)

(56) References Cited

U.S. PATENT DOCUMENTS

| | | |
|---|---|---|
| 3,660,933 A | 5/1972 | Wong |
| 3,757,470 A | 9/1973 | Shimamoto et al. |
| 3,842,535 A | 10/1974 | Lahr |
| 3,991,514 A | 11/1976 | Finck |
| D244,838 S | 6/1977 | Lebreux |
| 4,028,847 A | 6/1977 | Davis et al. |
| 4,045,909 A | 9/1977 | Moss |
| 4,059,922 A | 11/1977 | Digiacinto |
| 4,179,846 A | 12/1979 | Carlisle |
| 4,209,944 A | 7/1980 | Nozawa |
| 4,211,034 A | 7/1980 | Piesner |
| 4,216,617 A | 8/1980 | Schmidt |
| 4,216,618 A | 8/1980 | Davis et al. |
| 4,218,847 A | 8/1980 | Leroux |
| 4,255,896 A | 3/1981 | Carl |
| D259,011 S | 4/1981 | Daenen |
| 4,270,309 A | 6/1981 | Baumann |
| 4,279,101 A | 7/1981 | Leroux |
| 4,310,990 A | 1/1982 | Payne |
| 4,315,381 A | 2/1982 | Dvorin |
| 4,379,375 A | 4/1983 | Eisenberg et al. |
| 4,419,842 A | 12/1983 | Paloian |
| 4,467,561 A | 8/1984 | Tsuchiya |
| 4,487,164 A | 12/1984 | Yanagisawa |
| 4,493,163 A | 1/1985 | De |
| 4,574,520 A | 3/1986 | Arledge |
| 4,594,811 A | 6/1986 | Tokoro |
| 4,603,506 A | 8/1986 | Powell, Jr. |
| D288,793 S | 3/1987 | Carlson |
| 4,699,086 A | 10/1987 | Mori |
| 4,699,087 A | 10/1987 | Mori |
| 4,728,082 A | 3/1988 | Emmett, Jr. et al. |
| 4,756,120 A | 7/1988 | Arledge |
| 4,780,989 A | 11/1988 | Mears et al. |
| 4,813,997 A | 3/1989 | Kinnersley et al. |
| 4,818,579 A | 4/1989 | Uchida |
| 4,860,490 A | 8/1989 | Morris et al. |
| 4,878,043 A | 10/1989 | Heusquin et al. |
| 4,926,585 A | 5/1990 | Dreschel |
| 4,932,158 A | 6/1990 | Roberts |
| 4,953,322 A | 9/1990 | Edwards |
| D312,745 S | 12/1990 | Daenen |
| 5,037,688 A | 8/1991 | Uchida |
| 5,053,060 A | 10/1991 | Kopf-sill et al. |
| 5,054,233 A | 10/1991 | Evans |
| 5,073,401 A | 12/1991 | Mohr |
| 5,121,708 A | 6/1992 | Nuttle |
| 5,175,131 A | 12/1992 | Lang et al. |
| 5,261,185 A | 11/1993 | Koide et al. |
| 5,323,567 A | 6/1994 | Nakayama et al. |
| 5,385,589 A | 1/1995 | Kratky |
| 5,440,836 A | 8/1995 | Lee |
| 5,466,373 A | 11/1995 | Handwerker et al. |
| 5,525,505 A | 6/1996 | Young et al. |
| 5,585,505 A | 12/1996 | Mulder et al. |
| 5,598,663 A | 2/1997 | Kikuchi |
| D379,891 S | 6/1997 | Hampshire |
| 5,638,638 A | 6/1997 | Moskowitz |
| D384,907 S | 10/1997 | Moskowitz |
| D385,213 S | 10/1997 | Mcallister |
| 5,771,634 A | 6/1998 | Fudger |
| D399,450 S | 10/1998 | Durbin |
| D416,102 S | 11/1999 | Oram et al. |
| 6,086,755 A | 7/2000 | Tepper |
| D436,887 S | 1/2001 | Fan |
| 6,216,390 B1 | 4/2001 | Peregrin |
| 6,219,966 B1 | 4/2001 | Lapointe et al. |
| 6,247,268 B1 | 6/2001 | Auer |
| 6,312,139 B1 | 11/2001 | Baker et al. |
| 6,448,202 B1 | 9/2002 | Miyazawa et al. |
| D484,363 S | 12/2003 | De Groote et al. |
| 6,779,299 B2 | 8/2004 | Clarke |
| 6,811,700 B2 | 11/2004 | Austin et al. |
| 6,862,842 B2 | 3/2005 | Mischo |
| 6,951,076 B2 | 10/2005 | Winsbury |
| D512,631 S | 12/2005 | Lhoste et al. |
| 6,988,816 B2 | 1/2006 | Witkowski |
| D526,525 S | 8/2006 | Wasserman et al. |
| 7,123,993 B1 * | 10/2006 | Freeman ................ A01G 25/16 239/69 |
| 7,243,460 B2 | 7/2007 | Darlington |
| 7,396,441 B2 | 7/2008 | Senkiw |
| D586,688 S | 2/2009 | Bromley et al. |
| D592,011 S | 5/2009 | Fujimoto et al. |
| D594,775 S | 6/2009 | Moreau |
| 7,591,100 B2 | 9/2009 | Sato |
| D604,196 S | 11/2009 | Bissonnette et al. |
| D604,197 S | 11/2009 | Bissonnette et al. |
| D634,669 S | 3/2011 | Brandstaetter |
| 7,934,340 B2 | 5/2011 | Zettl |
| D644,388 S | 8/2011 | Quan |
| 8,009,048 B2 | 8/2011 | Hyde et al. |
| D657,628 S | 4/2012 | Sink et al. |
| 8,261,486 B2 | 9/2012 | Bissonnette et al. |
| 8,327,582 B2 | 12/2012 | Storey |
| D684,429 S | 6/2013 | Lion et al. |
| D704,592 S | 5/2014 | Hung et al. |
| D711,195 S | 8/2014 | Cornu et al. |
| D713,284 S | 9/2014 | Prinster et al. |
| D725,545 S | 3/2015 | Warburton et al. |
| D729,115 S | 5/2015 | Prinster et al. |
| 9,084,418 B2 | 7/2015 | Ehr et al. |
| 9,220,206 B2 | 12/2015 | Walliser |
| D760,118 S | 6/2016 | Lepp et al. |
| 9,527,778 B2 | 12/2016 | Rosenthal et al. |
| 9,532,517 B2 | 1/2017 | Karbowski |
| D781,069 S | 3/2017 | Marshall et al. |
| 9,603,316 B1 | 3/2017 | Mansey et al. |
| D786,020 S | 5/2017 | Traub et al. |
| D792,808 S | 7/2017 | Verneuil |
| 9,730,398 B2 | 8/2017 | Halmos et al. |
| 9,848,544 B2 | 12/2017 | Hessel et al. |
| D819,737 S | 6/2018 | Wei |
| 10,010,034 B2 | 7/2018 | Zhan et al. |
| D840,757 S | 2/2019 | Peterson |
| D841,402 S | 2/2019 | Price |
| D846,802 S | 4/2019 | Nicoline et al. |
| D864,016 S | 10/2019 | Woltz |
| D868,523 S | 12/2019 | Chang |
| 10,602,673 B2 | 3/2020 | Prinster et al. |
| 10,631,544 B2 | 4/2020 | Bettiol |
| D888,602 S | 6/2020 | Kadosh |
| D888,603 S | 6/2020 | Tong |
| 10,959,402 B2 | 3/2021 | Price |
| 2002/0162275 A1 | 11/2002 | Robinson |
| 2005/0204619 A1 | 9/2005 | Park et al. |
| 2005/0240313 A1 | 10/2005 | Cartwright |
| 2005/0246954 A1 | 11/2005 | Bissonnette et al. |
| 2006/0156624 A1 | 7/2006 | Roy et al. |
| 2006/0168881 A1 | 8/2006 | Straumietis |
| 2006/0254138 A1 | 11/2006 | Bissonnette et al. |
| 2006/0272210 A1 | 12/2006 | Bissonnette et al. |
| 2007/0271841 A1 | 11/2007 | Bissonnette et al. |
| 2007/0271842 A1 | 11/2007 | Bissonnette et al. |
| 2008/0098652 A1 | 5/2008 | Weinbel |
| 2008/0222949 A1 | 9/2008 | Bissonnette et al. |
| 2008/0276534 A1 | 11/2008 | Bissonnette et al. |

(56) References Cited

U.S. PATENT DOCUMENTS

| | | |
|---|---|---|
| 2009/0151248 A1 | 6/2009 | Bissonnette et al. |
| 2009/0223128 A1 | 9/2009 | Kuschak |
| 2009/0231101 A1 | 9/2009 | Hyde et al. |
| 2009/0313891 A1 | 12/2009 | Vardeny et al. |
| 2010/0031566 A1 | 2/2010 | Azoulay |
| 2010/0319248 A1 | 12/2010 | Reyankar |
| 2010/0325952 A1 | 12/2010 | Young et al. |
| 2011/0056132 A1 | 3/2011 | Gardner |
| 2012/0171456 A1 | 7/2012 | Zuniga et al. |
| 2012/0277117 A1 | 11/2012 | Zayed et al. |
| 2013/0000199 A1 | 1/2013 | Muranaka |
| 2013/0019527 A1 | 1/2013 | Howe-sylvain |
| 2013/0036669 A1 | 2/2013 | Rabii et al. |
| 2013/0067813 A1 | 3/2013 | Storey |
| 2014/0007503 A1 | 1/2014 | Sroczynski |
| 2014/0200690 A1 | 7/2014 | Kumar |
| 2015/0005964 A1 | 1/2015 | Liotta |
| 2015/0040478 A1 | 2/2015 | Moghaddam |
| 2015/0196002 A1 | 7/2015 | Friesth |
| 2015/0223418 A1 | 8/2015 | Collins et al. |
| 2015/0250115 A1 | 9/2015 | Pickell et al. |
| 2015/0305259 A1 | 10/2015 | Galassi |
| 2015/0305261 A1 | 10/2015 | Wilson et al. |
| 2015/0319946 A1 | 11/2015 | Center |
| 2015/0351339 A1 | 12/2015 | Carmody |
| 2016/0050862 A1 | 2/2016 | Walliser |
| 2016/0066525 A1 | 3/2016 | Duquesnay et al. |
| 2016/0106048 A1 | 4/2016 | Moghaddam et al. |
| 2016/0128288 A1 | 5/2016 | Pettinelli et al. |
| 2016/0128289 A1 | 5/2016 | Wong et al. |
| 2016/0135395 A1 | 5/2016 | Umpstead |
| 2016/0212954 A1 | 7/2016 | Argento |
| 2016/0227722 A1 | 8/2016 | Storey |
| 2016/0302369 A1 | 10/2016 | Pickell et al. |
| 2016/0324090 A1 | 11/2016 | Miyabe et al. |
| 2016/0371830 A1 | 12/2016 | Barrasso et al. |
| 2017/0055470 A1 | 3/2017 | Polivka |
| 2017/0055473 A1 | 3/2017 | Baker |
| 2017/0105368 A1 | 4/2017 | Mehrman |
| 2017/0127622 A1 | 5/2017 | Hong |
| 2017/0139380 A1 | 5/2017 | Englard et al. |
| 2017/0150684 A1 | 6/2017 | Vuorinen et al. |
| 2017/0150687 A1 | 6/2017 | Loiske et al. |
| 2017/0208759 A1 | 7/2017 | Yano et al. |
| 2017/0238486 A1 | 8/2017 | De Feo et al. |
| 2017/0347547 A1 | 12/2017 | Lu et al. |
| 2018/0007849 A1 | 1/2018 | Cohen et al. |
| 2018/0014485 A1 | 1/2018 | Whitcher et al. |
| 2018/0035616 A1* | 2/2018 | Wagner .................. H05B 47/16 |
| 2018/0054986 A1 | 3/2018 | Fu et al. |
| 2018/0064044 A1 | 3/2018 | Billings |
| 2018/0065896 A1 | 3/2018 | Van Iersel et al. |
| 2018/0132434 A1 | 5/2018 | Fu |
| 2018/0132435 A1 | 5/2018 | Yano et al. |
| 2018/0133583 A1 | 5/2018 | Tran et al. |
| 2018/0184602 A1 | 7/2018 | Ofir et al. |
| 2018/0242539 A1 | 8/2018 | Bhattacharya et al. |
| 2019/0069497 A1* | 3/2019 | Broutin Farah ....... A01G 9/006 |
| 2019/0082617 A1* | 3/2019 | Moffitt ................. A01G 27/003 |
| 2019/0200541 A1 | 7/2019 | Park |
| 2019/0216029 A1* | 7/2019 | Wilcox .................. A01G 31/06 |
| 2019/0230938 A1 | 8/2019 | Dagher et al. |
| 2020/0053969 A1 | 2/2020 | Gehin et al. |
| 2020/0314320 A1* | 10/2020 | Bennette ................ F21S 10/06 |

FOREIGN PATENT DOCUMENTS

| | | | |
|---|---|---|---|
| CA | 2010873 A1 | 8/1990 | |
| CA | 2239135 A1 | 4/1998 | |
| CA | 2335311 A1 | 8/2002 | |
| CA | 2394830 A1 | 2/2004 | |
| CA | 2672070 A1 | 1/2011 | |
| CA | 2570740 C | 9/2014 | |
| CA | 2921310 A1 | 2/2015 | |
| CA | 2849585 C | 5/2016 | |
| CA | 2966267 A1 | 12/2017 | |
| JP | 2015065855 A | 4/2015 | |
| WO | WO-2015140820 A1 * | 9/2015 | ............ A01G 29/00 |
| WO | 2016164652 A1 | 10/2016 | |
| WO | 2018068042 A1 | 4/2018 | |

* cited by examiner

GARDENING APPARATUS

CROSS-REFERENCE TO RELATED APPLICATIONS

This application claims priority to U.S. Provisional Patent Application No. 62/840,889, filed Apr. 30, 2019, entitled "Gardening Apparatus," which is incorporated by reference herein, in the entirety and for all purposes.

FIELD

This disclosure relates to indoor gardening, and to automated systems for plant growth and cultivation. Applications include, but are not limited to, an automated gardening system or apparatus for growing herbs, vegetables, flowers and other plants, and methods for using such an apparatus.

BACKGROUND

Plants need water, light, and nutrients to grow, in an atmosphere with suitable oxygen, nitrogen and carbon dioxide content. An appropriate ambient temperature range is also desired, with suitable humidity, atmospheric pressure, and other environmental conditions.

When these conditions are met, many plants are capable of germination and growth through maturity with little or no outside attention. Absent a sufficient water supply, however, no plant can survive, and many plants including edible herbs, fungi, ornamentals and other garden varieties also need plant-specific nutrients to thrive.

Outdoor plants are strongly differentiated based on climate and environmental conditions, with substantial seasonal dependence in the growth cycle. Indoor gardening can provide for a much wider choice in plant varieties, with year-round growth, independent of the outside environment. Ambient conditions within an indoor environment can be more consistent due to the ability to control room temperature and humidity, which can provide better growth conditions over the entire plant life cycle. Climate control, for example, can be provided by the room environment in which the user places the gardening device.

In hydroponic and soil-less cultivation techniques, however, the absence of a traditional growth medium can also pose challenges for nutrient delivery. There is also a need to provide indoor plant and gardening opportunities without requiring the user to constantly manage the growth environment. Many of these users place an emphasis on smaller-scale, natural products and processes, and seek year-round, fresh, clean and simple gardening opportunities, which are distinct from the larger-scale and industrial farming techniques through which the majority of the food supply is traditionally produced. For all of these reasons, more advanced and flexible indoor gardening techniques are required, which do not suffer all the same limitations exhibited by the prior art.

SUMMARY

This disclosure relates to an automated gardening apparatus suitable for growing plants indoors, and systems and methods for operating such an apparatus. The apparatus includes a base, a fluid reservoir, and a plant tray or support structure that can be disposed on or supported by the reservoir. The plant tray is adapted for receiving one or more modular plant inserts, and for growing plants from the inserts. The plant tray can define a flow structure for channeling fluid to the plant inserts. A pump or other fluid delivery mechanism can be provided to supply the fluid from the reservoir to the plant tray, or to plants on the plant tray; e.g., in the form of an irrigation fluid supplied to the plant inserts or roots, or as a fog or mist applied to the plants. The apparatus can also include a lighting system disposed in a light assembly, a camera, one or more ambient light sensors (e.g., two ambient light sensors or more), a fluid level sensor, and one or more environmental sensors such as temperature and humidity sensors, and/or a barometric sensor.

The light assembly can be supported above the plant tray, with the lighting system adapted to generate a spectrum of light selected for growth of plants from the modular inserts. A control processor can be configured for controlling the irrigation cycle by operating the pump to produce fluid flow, and for controlling the light spectrum and intensity by activating individual lighting elements. A spray system, fogger or misting device can also be used, for example an ultrasonic transducer or spray nozzle for aeroponic misting, or other hydroponic or aeroponic technique. The light spectrum and intensity can be controlled by activating and deactivating the lighting elements together or by modulating individual groups of the lighting elements; e.g., by activating, deactivating, brightening or dimming groups of one or more lighting elements selected for low frequency, middle frequency and/or high frequency contributions, including but not limited to red, blue, green, yellow and white (broadband) spectral contributions.

The fluid flow and light spectrum and intensity can be further controlled according to a dynamic recipe or algorithm, taking into account one or more of the plant type, growth stage, and ambient conditions measured by the sensors, such as ambient light exposure, reservoir fluid level, temperature, and humidity. An interface can be provided in communication with the control processor, for communicating the growth stage and other plant health information with a user device, and for receiving user commands. Wall mount and shelf support structures are also available, as adapted for supporting a plurality of growing systems in a user-designed ecosystem.

DETAILED DESCRIPTION

An automated gardening apparatus is disclosed to provide users with year-round access to fresh, natural plants and plant products. A biodegradable pod design provides plant-specific and controlled-release nutrients, with controllable/programmable lighting and watering cycles to provide healthy and nourishing products year-round. The pods include controlled-release nutrients and seeds, as well as a growing substrate or matrix of organic and/or inorganic matter in which the seeds and nutrients are disposed. The apparatus is suitable for use indoors or outdoors, depending on climate conditions, and makes growing and harvesting plants enjoyable and easy, while limiting the use of plastic packaging and other disposables, as compared to other indoor gardening products. For example, the apparatus can use sustainable packaging, such as recyclable cardboard packaging and pod pack sleeves, and pod pack boxes that are home compostable within a suitable time period (e.g. within a month to 45 days). The automated apparatus also enables users to grow various plants without needing extensive knowledge or experience in hydroponic horticulture.

Figure 1:
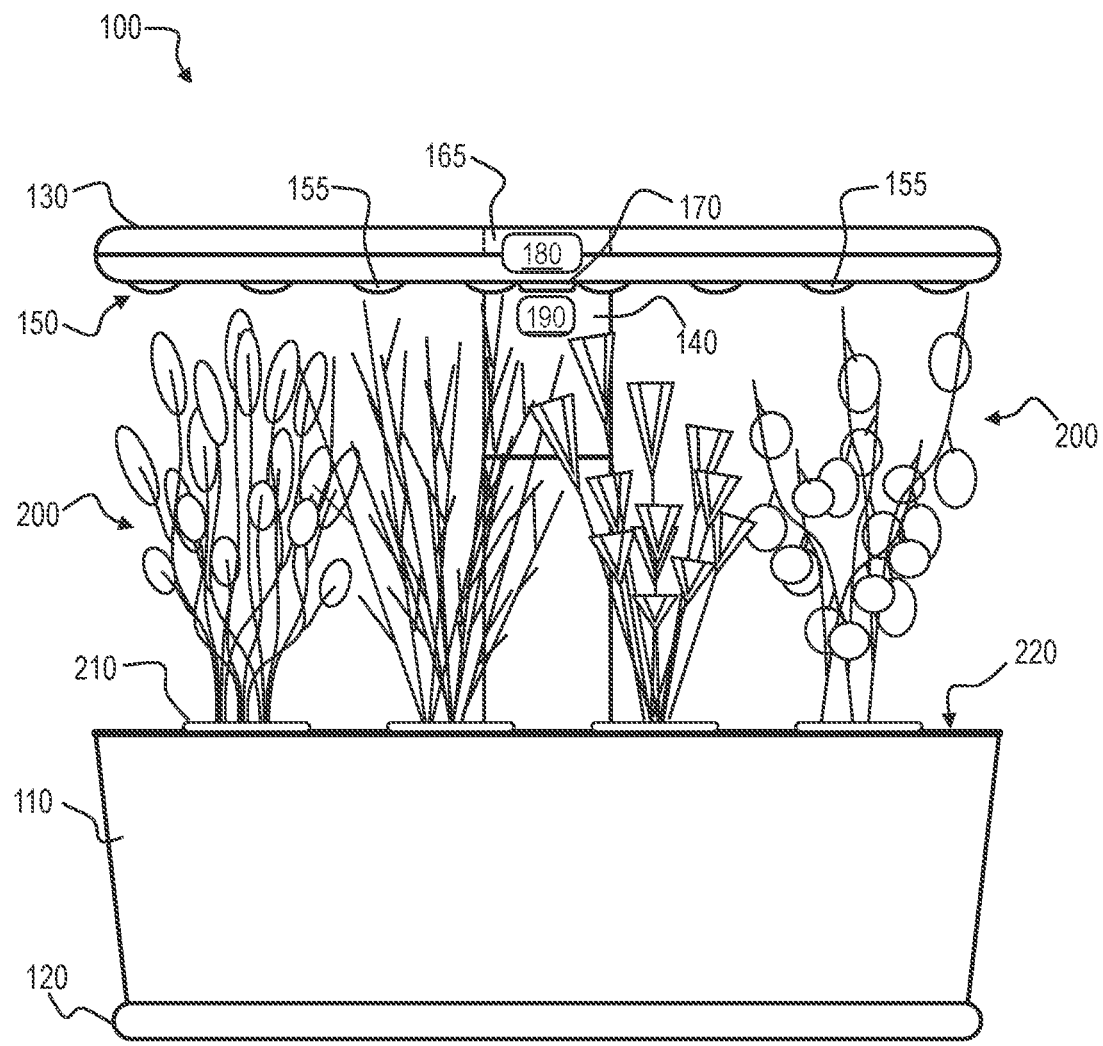
FIG. 1 is a front elevation view of an automated gardening apparatus.

FIG. 1 is a front elevation view of an automated gardening apparatus 100 for growing plants 200. As shown in FIG. 1, apparatus 100 includes a fluid reservoir 110 supported on a base 120. A light assembly 130 is coupled to the base 120 via an adjustable or telescoping support 140.

Light assembly 130 includes a lighting system 150 with one or more lighting elements 155, adapted to direct a selected spectrum of light onto plants 200. Suitable lighting elements 155 include light emitting diodes (LEDs), which can be controlled by selected activation, brightening and dimming to emit a range of different pre-defined or variable colors and frequencies distributed across the visible spectrum, and in the infrared and ultraviolet. The intensity and frequency distribution of the lighting spectrum can be determined according to a lighting schedule, and modified in real time based on a dynamic recipe or algorithm.

Lighting system 150 may also use fluorescent, incandescent or halogen lighting elements 155, or any combination of solid state LEDs, organic light-emitting diodes (OLEDs), polymer light-emitting diodes (PLEDs), thin-film lighting elements, spectrum shifting (e.g., quantum dot) lighting elements, plasma lighting, and laser lighting elements 155, with or without traditional fluorescent, incandescent and halogen lighting elements 155. Additional lighting elements 155 can also be attached to the support 140, in order to provide supplemental light for the plants 200, for aesthetic purposes, or to improve imaging by the camera 170. One or more computer hardware-based controllers 160 and 165 are provided to control the lighting system 150; e.g. using a system controller 160 in the base 120, and a local lighting controller 165 disposed on a circuit board with the lighting elements 155. Depending on embodiment, the light assembly 130 may also include one or more optical sensors or cameras 170, and one or more non-optical sensors including, but not limited to, environmental sensors. Additional features may include, but are not limited to, a control panel 180 with one or sensors and manual control features, and a spray nozzle 190, as shown with more detail in FIG. 2.

The system controller 160 can be provided in the base 120, light assembly 130, support 140 or reservoir 110, or in distributed form, and adapted to control both the lighting system 150 and one or more of a pump, actuator, and other automated components of apparatus 100, as described herein.

The apparatus 100 and lighting system 150 can be adapted for growing a wide variety of different plants 200, selecting from among a range of modular, interchangeable, pre-seeded, nutrient-infused plant inserts or "pods" 210, for example with selected seeds and nutrients embedded in a growth medium. Alternatively, user-selected seeds can be planted in a custom pod or modular insert 210. The modular inserts 210 are supported on a plant support, for example a plant tray 220, coupled to the top of reservoir 110, allowing for exposure of the plants 200 to the light spectrum generated by lighting system 150. The apparatus 100 can also adjust the lighting and watering of individual sections to allow each plant to use its own optimal recipe.

Suitable materials for the reservoir 110, base 120, light assembly 130, support 140 and plant tray 220 include durable plastics and other polymers, composite materials, metals, and combinations thereof. Depending on embodiment, the exposed surfaces may be provide of food safe materials, or provided with a food safe coating. Depending on application, the inserts 210 can also be provided in the form of sheets, blocks, trays, pods and other modular and custom formats, as adapted for different varieties of seeds, seedlings, cuttings, clones, bulbs and spores, either user-provided or preselected and embedded in the growth medium.

The plants 200 shown in FIG. 1 are merely representative. In this particular example, four different varieties of plant 200 are shown, each growing from a respective insert or pod 210. Apparatus 100 can also accommodate more or fewer plants 200 and inserts 210, for example one, two, three, four, five or more inserts 210, and the plants 200 may be the same or different.

Suitable plants 200 include herbs, fruits, vegetables, grasses, microgreens and flowering plants, in either ornamental or edible (or otherwise consumable) varieties. As used here, the term "plant" also encompasses fungi including mushrooms, algae, and other organic growths, including but not limited to edible plants and mushrooms, and ornamental or edible plants, flowers, grasses and weeds, and encompassing both domesticated garden varieties and wild, naturally occurring or genetically modified species. Customized plant inserts 210 can also be provided with user-selected seeds, or with pre-germinated plants, shoots, seedlings, or plants at any stage of growth. A software platform can employ artificial intelligence to create custom pod packs that have the same harvest time and growth requirements as currently planted pods.

For example, custom and bespoke pod packs can be made to order or customized with particular plant varieties, seeds, and/or nutrients. The customized pod packs may be based on user input (e.g., with plants, seeds and nutrients selected based on user preferences), or based on data collected by the system, such as historical plant and user data indicating plant types grown, time periods when particular plants are harvested or used, seeds that are selected, nutrients applied, and the like. The system can also receive user input and analyze collected data to determine the plants, seeds, nutrients, and other ingredients for either a custom or standard, continuously stocked and available pod pack; e.g., for ordering or promoting via a smart device application, as described herein.

Figure 2:
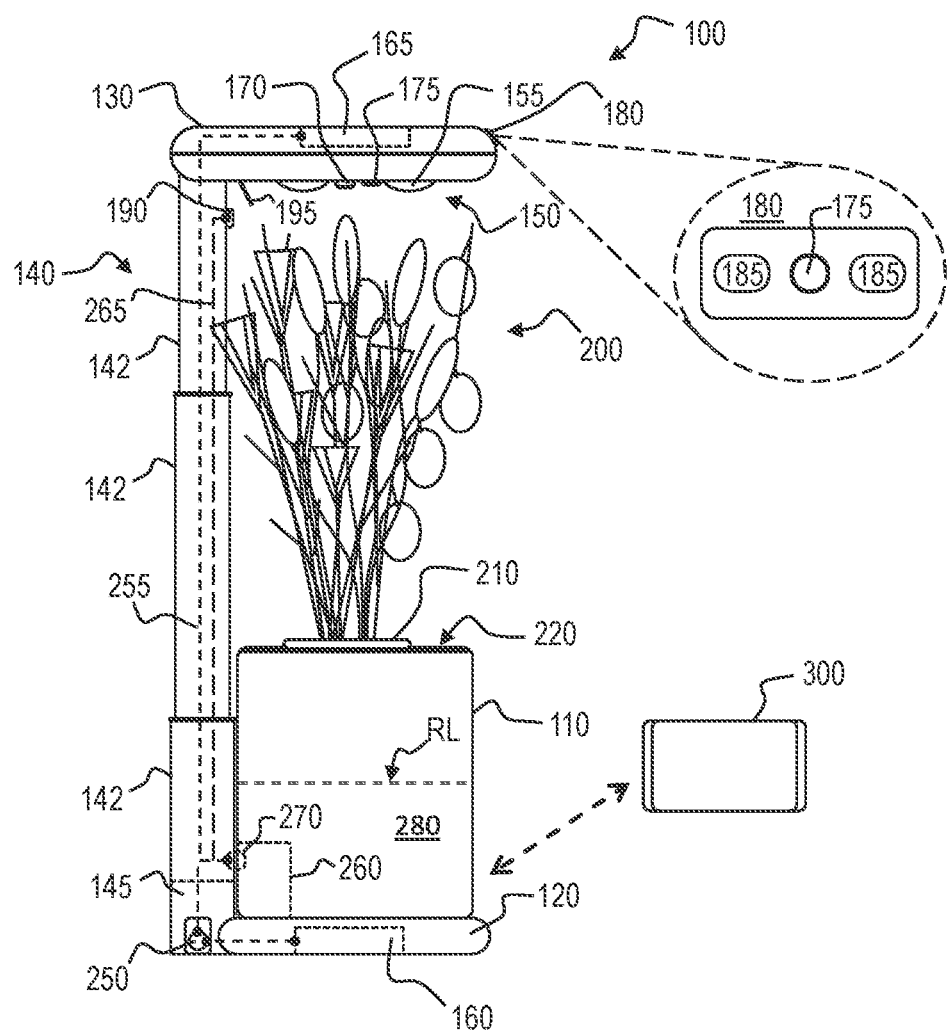
FIG. 2 is a side elevation view of the gardening apparatus.

FIG. 2 is a side elevation view of the automated gardening apparatus 100. As shown in FIG. 2, an adjustable support 140 couples the lower base 120 of apparatus 100 with the upper light assembly 130, for example using a plurality of telescoping sections 142. Support can thus be adapted to adjust the height of lighting system 150 and camera 170 with respect to the plants 200, and with respect to the inserts 210 disposed in plant tray 220.

Light assembly 130 includes a lighting system 150 with one or more light sources 155, and a local lighting controller 165. A digital camera 170 is mounted to the underside of light assembly 130, facing the plants 200 and inserts 210 on tray 220. As shown in FIG. 2, one optical or environmental sensor 175 is mounted facing down, adjacent the digital camera 170 (e.g., on the same camera board), and a second such sensor 175 is mounted on the top of the light assembly 130, facing up (e.g., on a button board with additional features such as a global power or wireless pairing control). In some embodiments, a control assembly 180 is provided with one or more optical sensors 175 and capacitive buttons or similar physical control elements 185, and adapted for manual control of the lighting system 150 and lighting elements 155 via communication with the controller 160. Additional manual control features 185 can be adapted for controlling the irrigation nozzle 190 and pump 260, for pairing the controller 160 with user device 300, for resetting the apparatus 100, and other interactive user functions.

A telescoping actuator or similar adjustment mechanism 145 can be provided to adjust the height of light assembly 130 by manipulating the telescoping support sections 142 of the base 140, according to instructions from the system controller 160. Alternatively, the support sections 142 can be manually adjusted to desired height, or a fixed height support 140 can be provided. A trellis system or similar structure can be attached to the base 120 or to the lower (stationary) portion 142 of the support 140, for use with maturing vines or other plants 200, at an appropriate growth stage. An enclosure or similar structure can be attached to the support 140 to provide an enclosed or semi-enclosed environment for the plants 200, and may also be adapted to modulate airflow, reduce odor, and prevent or reduce access to plants 200 by pets, animals, insects and pests.

An external connector or port 250 and an electrical bus and/or electrical line 255 are provided for power and data communications within apparatus 100. For example, a power and/or data port 250 can be mounted to or included in the lower part of the support 140, as shown in FIG. 2, or in the base 120, on the back of the support 140, or in the light assembly 130. In some embodiments, a wireless port 250 is used, and apparatus 100 can be inductively powered, solar powered, or battery powered.

The system controller 160 can be powered by the external power port 250, via the electrical bus 255, or using an internal power supply. The controller 160 includes a computer processor, memory, and a combination of hardware driver and interface components adapted for communicating data and command instructions with (to and from) the lighting system 150, camera 170, sensors 175, controls 185, and the other electrical components of apparatus 100.

A pump or pump assembly 260 is provided in or on reservoir 110, and configured to distribute a water or nutrient solution (or other fluid) 280 from reservoir 110 to tray assembly 220 for irrigating the plants 200 and inserts 210. A fogger or misting device with a nozzle 190 and splash guard 195 can also be provided on one or both of the support 140 and lighting assembly 130, for example using an ultrasonic transducer, fogger or mechanical spray nozzle 190 coupled to pump 260 via a flow line 265. The pump 260 can be connected to the electrical bus 255 using a selective coupling or connection 270 between the reservoir 110 and support 140, for example a contactless coupling 270, as described below.

The pump 260 can be adapted to provide fluid flow from reservoir 110 to the tray assembly 220 for irrigation of the plant inserts 210, and/or to the nozzle 190 for spraying and misting the plants 200, or for other hydroponic or aeroponic irrigation techniques. One or more splash guards 195 can be provided on any of the front, back and sides of the lighting assembly 130, and adapted to shield the lighting elements 155 from overspray or other fluid exposure, while protecting the lighting system 150 from incidental physical contact. Alternatively splash guards 195 may be absent.

The bus 255 provides power and data communications between system controller 160, external port 250, pump assembly 260 and other automated components of apparatus 100, including any of the support actuator 145, lighting system 150, lighting controller 165, camera 170, and optical or environmental sensors 175. Controller 160 can also include an interface for external data communications, for example a wireless interface for communications with a user device 300, or a hard-wired interface for communications with device 300 via external port 250; e.g., using the internet or a cloud connection to device 300. Suitable user devices 300 include smart phones, tablets, mobile devices, personal computers, smart home devices, virtual and cloud-based interactive terminal systems, and other hardware, software, and virtual computer-based user devices and applications suitable for interactive communications between the user and apparatus 100. Suitable wireless communications include Wi-Fi, BLUETOOTH and other wireless protocols, as described herein. Suitable hard-wired network connection include USB ports, serial ports, smart phone connections, parallel ports, and other suitable data and power connections 250. Suitable devices 300 will also employ local application software adapted for control and data communications with apparatus 100, using the selected wired or wireless communications protocol.

Coupling 270 provides for electrical communication between the pump assembly 260 and system controller 160, via the electrical bus 255. For example, coupling 270 can be adapted to selectively couple and decouple the pump 260 using a wireless or contact-less inductive coupling, preventing leakage of fluid 280 when reservoir 110 is removed from base 120. The electrical coupling 270 can also be provided in other sealed, waterproof forms, for example using through-connectors disposed in the reservoir housing, or with a self-sealing connection, positioned either above or below the working level RL of the reservoir 110, depending on the electrical bus location. Coupling 270 can also be disposed in the bottom of the reservoir 110, in order to provide a more direct connection between the pump assembly 260 and the system controller 160 in base 120.

Connector 270 allows for quick and easy removal of reservoir 110 from base 120 and support 140, for cleaning, maintenance, harvesting and pruning of the plants 200, and for selectively inserting, removing, and exchanging plant inserts 210 in tray 220. One or more connectors 270 can also be adapted for wall mounting, and for other accessory attachments to be secured to the base (e.g., using one or more notches or other coupling features in the base 120 ad wall mount accessory; see FIG. 3B). The reservoir 110 is easily repositioned and replaced on the base 120 to reconnect the pump assembly 260 with the controller 160 (and the other components of apparatus 100), without having to remove the fluid 280 or drain the reservoir 110, except when desired. The pump assembly 260 can also be removable and replaceable in the reservoir 110 for cleaning and maintenance, and reservoir 110 can be adapted for use in a household dishwasher or similar apparatus.

Reservoir and Plant Tray Assembly

Figure 3A:
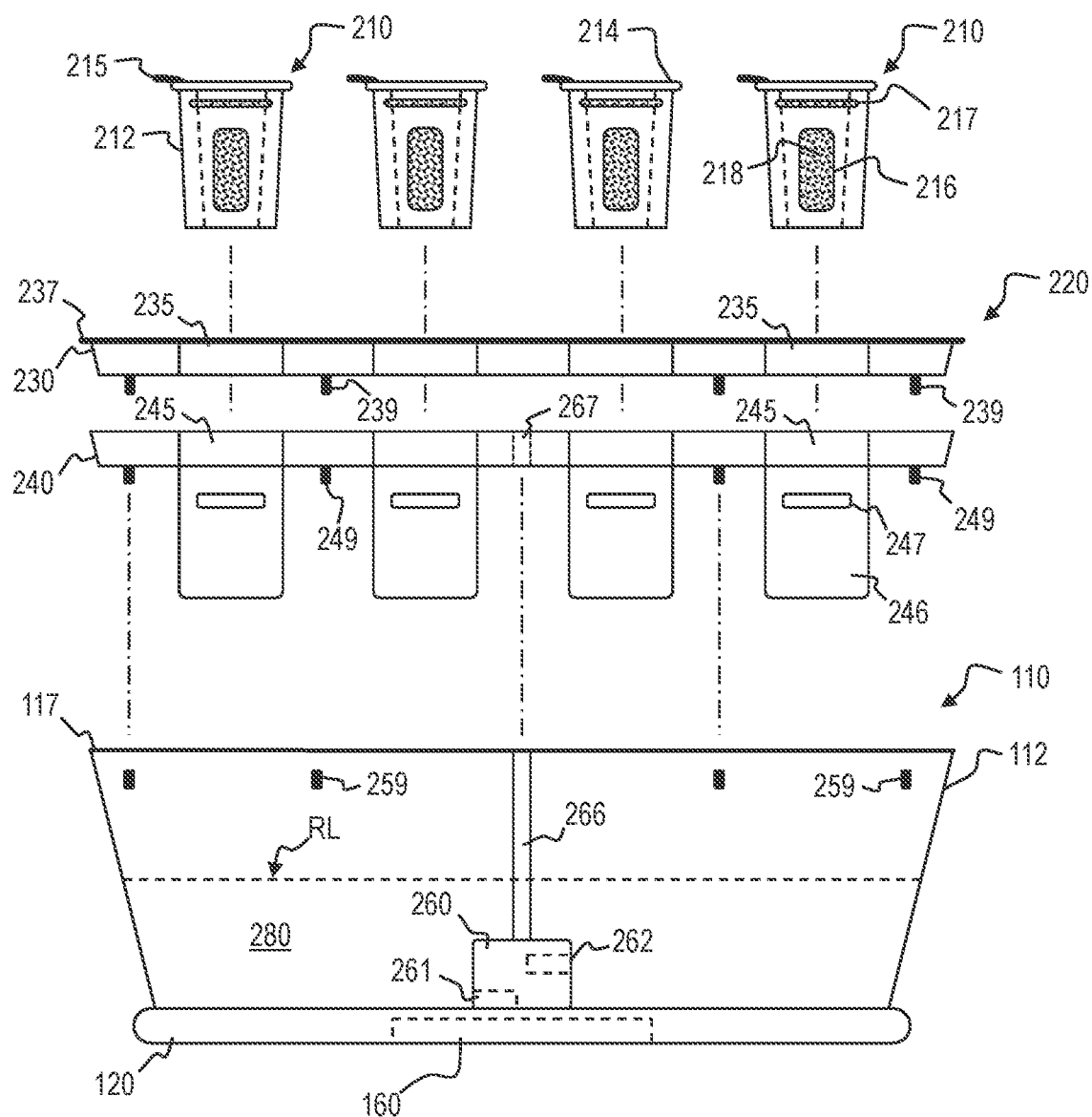
FIG. 3A is an exploded section view of the automated gardening apparatus, showing the reservoir, plant tray, and modular plant inserts or pods.

FIG. 3 is an exploded section view of the gardening apparatus, showing the reservoir 110, base 120, plant tray assembly 220, and plant inserts or pods 210. The tray assembly 220 includes a first (top or upper) panel 230 adapted to support one or more plant inserts or pods 210, and a second (lower or bottom) panel 240 adapted to support the upper panel 230.

The tray components are adapted for quick and easy removal and replacement of the tray assembly 220 on the reservoir 110. Tray 220 is assembled by coupling the upper panel 230 onto the lower panel 240, for example along the top rim structure 237. The upper panel 230 is adapted to nest inside the lower panel 240, with a space between the two panels for irrigation of the plant inserts 210.

As shown in FIG. 3, each plant insert 210 includes a main body 212 with a collar or rim structure 214 for supporting the insert 210 within an opening or aperture 235 in the upper tray panel 230. A handle or lip 215 can be provided on one or more sides of the rim 214, and configured for grasping, insertion, removal, and other manipulation of plant inserts 210 by a user. The lip feature 215 can also be adapted to support the insert 210 on a glass, cup, or other container or reservoir, independent of the apparatus 100.

The main body 212 of each insert 210 is formed with one or more openings 216, 217, and adapted to hold a growing medium 218 for growing selected plants. Suitable media 218 include a combination of organic matter, seed, and nutrients disposed in a matrix. The growth medium 218 is exposed at the openings 216, 217 for aeration and irrigation, and to promote and direct root growth; for example, to promote root grown in a particular or preferred direction, such as downward toward the fluid reservoir 110.

The upper tray panel 230 has a plurality of apertures 235 adapted for receiving the plant inserts 210 supported on the rim 214, which has a greater diameter than the apertures 235. The insert bodies 212 extend down through openings 245 in the lower panel 240, and into complementary receptacle structures 246, within the interior volume of the reservoir 110. Receptacles 246 can be sized to accommodate the vertical height of the insert body 212, with additional openings 247 for aeration and irrigation. Alternatively the insert body 212 can extend down past the receptacles 246, or receptacles 246 may be absent, so that at least a portion of the insert bodies 212 is exposed within the reservoir 110, suspended below the lower panel 240.

The plant tray 220 is assembled onto the reservoir 110 by coupling the top rim 237 of the upper panel 230 along the top rim 117 of the reservoir housing 112. Water can then be poured directly onto the tray assembly 220 to fill reservoir 110, producing healthy, natural plants including herbs, mushrooms, tomatoes, ornamental and edible flowers, and other fruits, vegetables, grasses and plant products. The receptacles 246 in the lower panel 240 can also be adapted for use as a stand configured to support the tray assembly 220 upright when removed from the reservoir 110; e.g. in order to set the tray assembly 220 upright on a surface with the upper and lower panels 230 and 240 supporting the inserts 210.

One or more mechanical fasteners 239, 249 can be provided in the upper panel 230 or lower panel 240 (or both), and attached to complementary features 259 in the reservoir housing 112. For example, magnetic or ferromagnetic elements 239, 249, 259 can be provided with an alternating pole arrangement, and selected for a desired attachment strength to facilitate easy assembly and disassembly of panels 230 and 240, and to secure the assembled plant tray 220 onto the reservoir 110. Other mechanical fasteners such as bolts or screws can also be used, or pins 239 with bushings or sleeves 249 disposed on the upper and lower panels 230 and 240, and adapted for coupling with lugs or similar structures 259 on the inside wall of the reservoir housing 112.

The pump assembly 260 is provided either in or adjacent the reservoir 110, and adapted to pump the water and nutrient solution or other fluid or mixture 280 to the plant tray 220. For example, a rotary pump mechanism 260 can be operated to drive fluid 280 from below reservoir level RL into flow channel 266, extending upward from pump assembly 260 to an outlet 267 that opens into the lower panel 240. One or both of the upper and lower panels 230, 240 may include flow structures configured to direct the fluid from pump outlet 267 toward the openings 245 in lower panel 240, where the plant inserts 210 are disposed. The upper openings 217 in the insert bodies can be positioned in the space between the upper panel 230 and lower panel 240, providing for irrigation of growth media 218.

A filter 261 and water or liquid (fluid) level sensor 262 can be included in the pump assembly 260, or provided as a separate element. Suitable level sensors 262 include, but are not limited to, pressure transducers, Hall effect sensors, optical sensors, and float sensors, as adapted to sense the operational level RL of the fluid 280 in reservoir 110. Level sensor 262 communicates fluid level data with the system controller 160, in order to communicate with a user when more fluid is needed.

For example, the fluid level sensor 262 can be configured to sense when fluid is full or at a sufficiently high predetermined level and the system controller 160 may signal that fluid level to a user, or otherwise indicate that more fluid is not required at a particular time. The fluid level sensor 262 can also sense when fluid is at some other predetermined intermediate level such as half full or higher, and the system controller 160 may signal that level to the user, or otherwise indicate that more fluid is needed (or will be needed at a particular time). The fluid level sensor 262 can also sense when fluid level is empty, low, or critically low; e.g., indicating that the pump cannot operate unless more fluid is added, and the system controller 160 may signal that level to a user, indicating that more fluid is required.

The system controller 160 can also be adapted to dynamically modulate the irrigation cycle based on the level determined by the fluid level sensor 262 and/or one or more other optical, non-optical, or environmental sensors provided in the reservoir 110, or elsewhere on the apparatus 100, in order to automatically conserve fluid resources when the fluid level RL is low, and to increase the irrigation rate when additional fluid 280 is available. For example, such fluid conservation behavior can be used if the user enables "vacation mode" to ensure that a reservoir fluid refill is not required while the user is away.

Figure 3B:
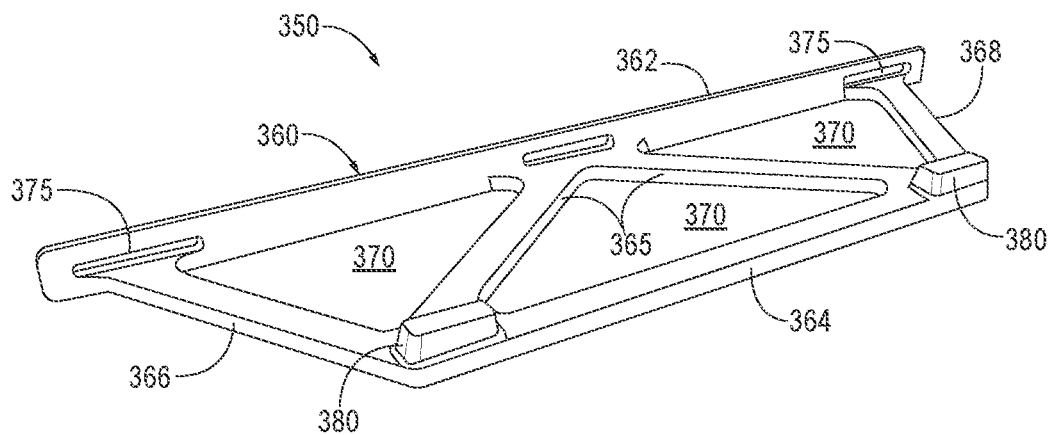
FIG. 3B is a perspective view of a shelf support for the automated gardening apparatus; in a wall-mounted application.

FIG. 3B is a perspective view of a shelf support 350 for the automated gardening apparatus; e.g., in a wall-mounted embodiment. As shown in FIG. 3B, shelf support 350 includes a perimeter frame 360 with one or more horizontal supports 365 spanning the frame 360 from a back portion 362 to an opposite front portion 364, and from a first (e.g., left) side 366 to an opposite second (e.g., right) side 368.

Shelf support 350 provides for applications of the automated gardening apparatus where counter space is limited, and where wall mounting is desirable. A number of shelf supports 350 can also be used to provide a vertical garden wall ecosystem, with multiple gardening systems arranged according to available space and user preference.

Frame 360 can be formed as a substantially unitary structure; e.g., from a metal material such as die cast aluminum, or from another metal or metal alloy. Openings 370 are defined between the adjacent frame portions or members 362, 364, 365, 366, 368, forming a web structure for increased strength and reduced weight. Other suitable materials for frame 360 include wood, composite materials, polymers, plastics, and combinations thereof.

In one configuration, the back portion 362 of the frame 360 is formed as a brace with slots 375 for wall mounting; e.g., using screws or other mechanical fasteners. The base of a gardening apparatus can be supported on the top of the webbed frame structure 360, using one or more stops 380 or similar mechanical couplings to secure the base against lateral motion. Alternatively, a two-piece configuration can be used, where the frame 360 is coupled to a separate back plate fixed to the wall. Additional, stops, notches or other features can also be provided to accommodate attachments of additional accessories.

Modular Plant Inserts (Pods)

Figures 4A, 4B:
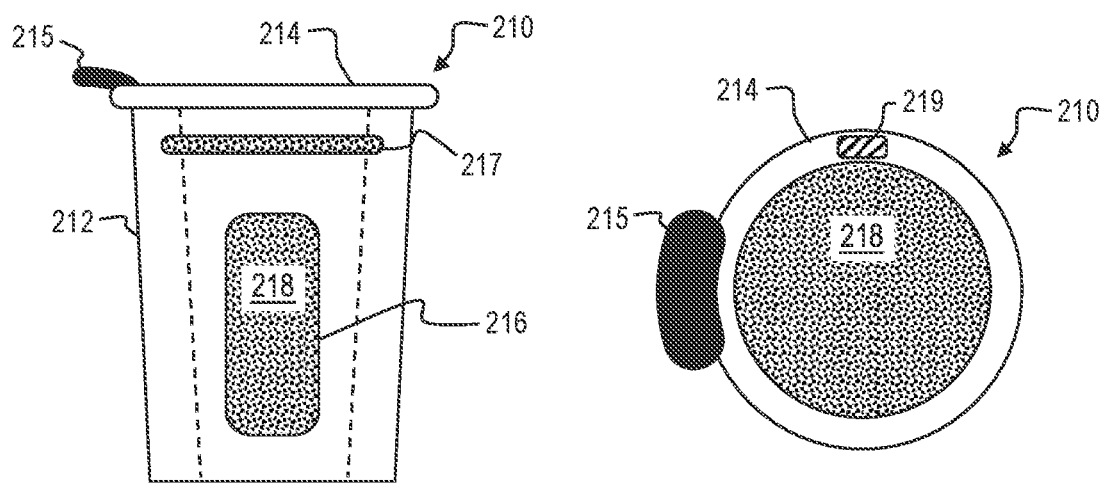
FIG. 4A is a side elevation view of a modular plant insert or pod for the automated gardening apparatus.
FIG. 4B is a top plan view of the modular plant insert or pod.
Figure 6:
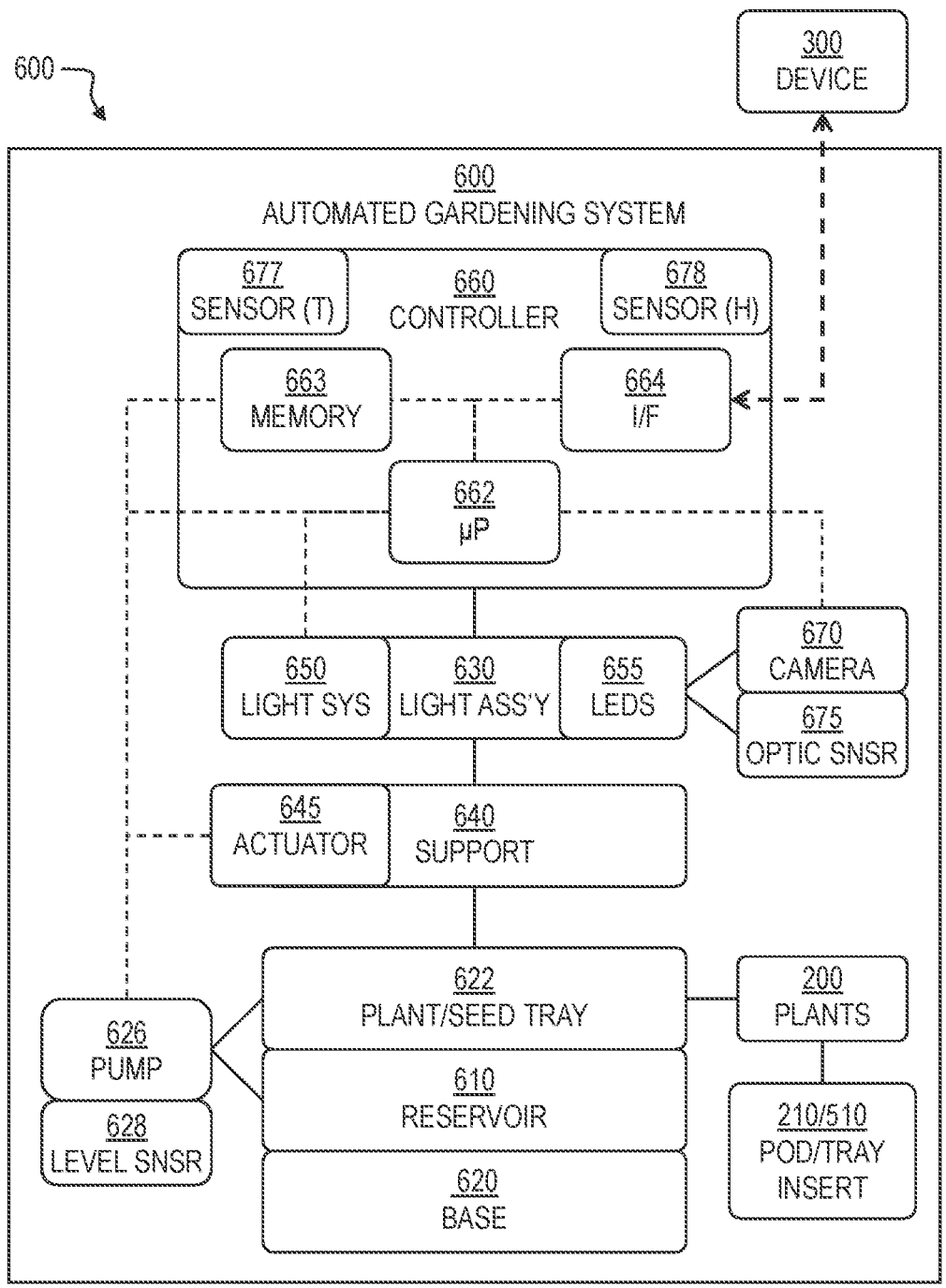
FIG. 6 is a block diagram of an automated gardening system, operable according to the disclosed gardening apparatus.

FIG. 4A is a side elevation view of a modular plant insert or pod 210 for a gardening apparatus; e.g., apparatus 100 of FIG. 1-3, or gardening system 600 of FIG. 6. FIG. 4B is a top plan view of the modular plant insert 210.

As shown in FIGS. 4A and 4B, each insert 210 includes a growing medium 218 disposed within a main body 212. The medium 218 includes a combination of organic matter, seed, and controlled-release nutrients, selected for growing particular plant varieties. The rim structure 214 supports the inserts 210 in the plant tray, with a handle or lip 215 for insertion and removal by a user. The main body 212 includes a number of openings 216 and 217, exposing the medium 218 for aeration, drainage and/or irrigation and root growth, as described above.

The organic growing medium 218 can be formed as a matrix with controlled-release nutrients selected according to plant type, as indicated by machine-readable indicia 219. Suitable indicia include bar codes, 2D scanning codes, color coding, machine-readable text, and other optical data formats readable by a camera, tablet, smart phone or mobile device to determine the plant type associated with each insert 210. Alternatively, radio-frequency, inductive or capacitive coding indicia can be used.

The nutrients in media 218 are plant-specific, and selected for controlled release over the growth cycle so that no additional additives (other than water) are required to grow healthy plants. Unlike other, more traditional indoor gardening systems, apparatus 100 can thus be automated and adapted for each type of plant or selected mixture of plants that is grown, using the identifying indicia 219 to determine the plant type or types, and a plant-specific recipe or algorithm to determine appropriate irrigation and light cycles. The inserts 210 can also be adapted for use with a biodegradable plant "sponge" type growth medium 218 made of processed plant material, and the pod housing 212 can be formed of plant-based polymers that are biodegradable over time.

The nutrient profiles can be developed using an artificial intelligence software platform that selects the appropriate nutrients based on the seeds. For example, the system may receive plant or seed data (e.g., related to plant or seed type) input by a user or determined by the system. In some applications, a camera may be used to take an image of a seed, shoot, plant, etc., and compare the image to plant or seed data in an external database (or a database available over the internet or cloud), in order to determine the plant or seed type represented in the image. The system can also determine suitable nutrients based on the plant or seed data. For example, the system may use the images or other stored data (e.g., historical nutrient profiles for various plant varieties or seed types) to determine a suitable nutrient profile based on the plant or seed data.

Irrigation

Figure 5A:
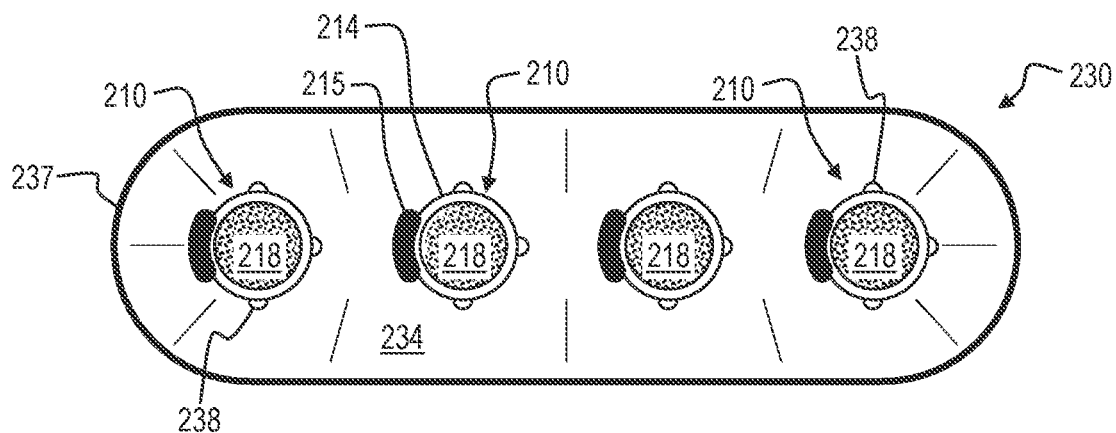
FIG. 5A is a top plan view showing the upper level of a plant tray for the automated gardening apparatus.
Figure 5B:
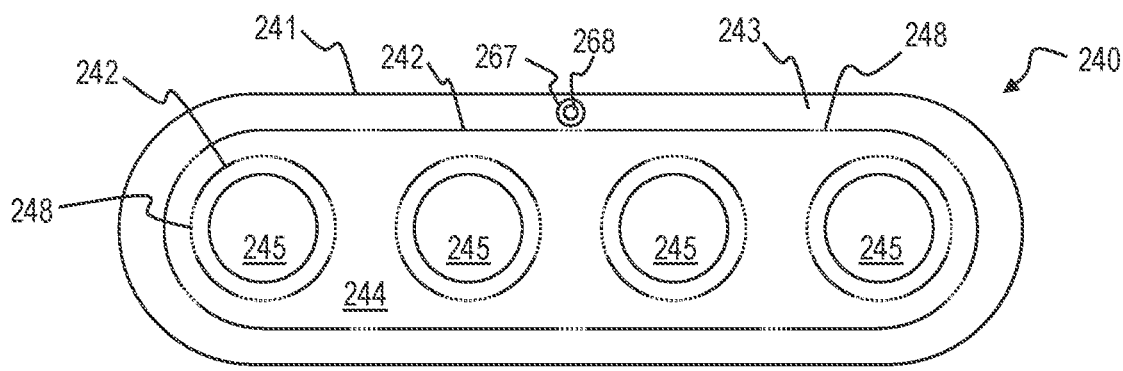
FIG. 5B is a top plan view showing the lower level of the plant tray.

FIG. 5A is a top plan view showing the upper level or top panel 230 of a plant tray 220. FIG. 5B is a top plan view showing the lower level or bottom panel 240. As shown in FIGS. 5A and 5B, both the upper panel 230 and the lower panel 240 can be adapted for flow control and irrigation of the modular plant inserts 210, and for controlling the fluid flow when refilling the reservoir.

As shown in FIG. 5A, the upper plant tray panel 230 is configured with a sloped top surface 234 and an optional food-safe water-repellent or flow-enhancing coating, in order to direct water and other fluids toward the modular plant inserts 210. Additional irrigation holes or openings 238 can be provided in the top surface 234 along the rim 214 of the inserts 210, or along or under the lip 215. The openings 238 can be sized and positioned both for irrigation of the growth medium 218 in the plant inserts 210, and to direct additional flow to fill the reservoir.

As shown in FIG. 5B, the lower plant tray panel 240 has an outer sidewall 241 and a peripheral flow structure 242, defining a flow channel 243 about the perimeter. The pump outlet 267 enters channel 243 through the top surface 244 of the lower panel 240, using a rubber or polymer flow diverter and seal 268 to direct the fluid flow laterally into channel 243. The fluid flows around the peripheral channel 243 and enters the central portion via one or more inlets 248, with additional flow structures 242 and inlets 248 to direct flow to the inserts 210 disposed in each opening 245. Excess fluid not absorbed by the organic growing medium 218 flows through and around the inserts 210, filling the reservoir as described above.

In the particular embodiment of FIGS. 5A and 5B, flow structures 242 extend upward from the top surface 244 of the lower plant tray panel 240, toward the bottom surface of the upper panel 230. Similar flow structures can also be provided on the lower surface of the upper panel 230, extending down toward the upper surface 244 of the lower panel 240. More generally, complementary flow structures 242 can be provided on both the top surface 244 of the lower panel 240, and on the bottom surface of the upper panel 230, as adapted for both irrigation of the plant inserts, and replenishment of the reservoir.

Figure 5C:
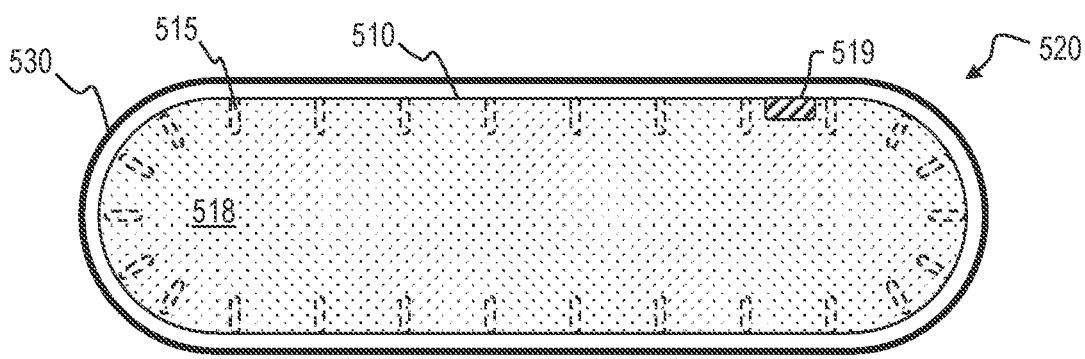
FIG. 5C is a top plan view of a modular seed tray insert for the automated gardening apparatus, for example in a micro-green seeding application.

FIG. 5C is a top plan view of a modular seed tray insert 510 disposed in a plant tray assembly 520. As shown in FIG. 5C, the tray assembly 520 includes a modular "seed sheet" or insert 510 disposed in a tray panel 530, with apertures 515 for fluid flow and/or root growth. The seed sheet or insert 510 includes a combination of selected seeds and controlled-release nutrients distributed in an organic medium or matrix 518, similar to growth media 218, and arranged in a continuous format. Indicia 519 can be provided on insert 510 to identify the plant type, as for indicia 219.

Some microgreen plants, grasses and other varieties are more suitable for growth in a continuous seeded growth medium 518, as opposed to discrete modular inserts, that can be spaced apart to accommodate larger plants with broader leaf, flower and fruit structures. Suitable plants for use with a modular tray insert 510 include, but are not limited to, microgreens, mushrooms, grasses, succulents, garnishes, mustard, wasabi, kale, broccoli, and other edible or ornamental varieties. A modular insert 510 can also be used to grow bean sprouts, shoots, edible algae, and seedlings for other plant varieties.

As shown in FIG. 5C, the seed tray assembly 520 includes a single modular seed sheet or insert 510, disposed in a seed tray panel 530. The tray panel 530 and insert 510 can be disposed into the lower panel 240 of a plant tray assembly 220, for example as shown in FIGS. 5A and 5B, in place of the top panel 230 and inserts 210. In these examples, irrigation can be controlled by directing fluid flow from the lower panel through apertures 515 in panel 530 using the existing lower panel flow structures alone, or in combination with additional flow structures on the bottom of seed tray panel 530. Alternatively, assembly 520 can be disposed directly onto the top of a reservoir, in place of the plant tray assembly 220. In these examples, the seed tray panel 530 can be provided with a pump inlet, flow diverter and suitable flow direction structures, along with one or more mechanical fasteners as shown in FIG. 3.

System Operation

FIG. 6 is a block diagram of an automated gardening system 600. System 600 can be configured to grow plants 200 according to any combination of features of apparatus 100 as shown in FIGS. 1-3. Similarly, apparatus 100 can also be configured according to any combination of elements in system 600.

As shown in FIG. 6, automated gardening system 600 includes a reservoir 610 disposed on a base 620. A light assembly 630 is coupled to the base 620 via a support 640, which can be fixed, manually adjustable, or automatically controlled. Light assembly 630 includes a lighting system 650, controlled by a computer processor system 660. One or more optical sensors or cameras 670 can be provided, for example in the form of a high definition digital camera 670 mounted to the light assembly 630.

In operation of system 600, controller 660 directs the lighting system 150 to generate a selected spectrum of light using one or more lighting elements 155. The light spectrum can be directed onto a variety of plants 200 grown from one or more modular plant inserts 210 or 510, which are selectively positioned on a growing stage or plant tray 622 mounted on the top of the reservoir 610. For example, one or modular plant pods or seed tray inserts 210 or 510 can be used, according to any combination of the features in FIGS. 4A-4B and 5A-5C.

The inserts can be disposed in a plant or seed tray 622 according to any combination of features disclosed for assemblies 220 and 520 as shown in FIGS. 5A-5C. Depending on embodiment, the plant tray 622 may have one, two or more individual levels or panels. In some embodiments, a first upper panel provides apertures for accepting the modular inserts 210 or 510, and a second lower panel defines a flow structure adapted for irrigating the plants 200 by channeling fluid flow to the modular inserts. Alternatively, the plant tray 622 can be assembled in a single-level or multi-level configuration, with or without flow channeling features.

The reservoir 610 includes a pump 626 adapted to supply fluid from the reservoir 610 to the plant tray, for example according reservoir 110 and pump assembly 260 of FIGS. 1-3. Suitable pump assemblies 626 provide fluid from the reservoir 610 to the plant tray 622, so that each modular insert is supplied with irrigation as described herein. A level sensor 628 can also be provided, to determine the level of fluid in the reservoir 610.

Light assembly 630 is supported on the base 620 via support 640, and includes a lighting system 650 with one or more LEDs or other lighting elements 655 adapted to generate a spectrum of light directed toward the plant tray 622, for example according to light assembly 130 and lighting system 150. The spectrum is selected for growth of the plants 200 from the modular inserts 210 or 510, when selectively disposed in tray 622 by the user.

One or more cameras 670 and optical sensors 675 are disposed in or on the light assembly 630, in order to detect the plant type or variety from the modular inserts 210, and to determine the plant size, height and other plant growth stage and plant health indicators, which can be stored as historical plant data. Data on the plant size, height and growth stage can be used to plot the plant's growth over time, providing a measure of growth and maturation rate, which can also be stored as historical plant data and compared to other stored historical plant data. AI software can be used to leverage the maturation data to predict harvest time.

Additional environmental sensors such as temperature and humidity and/or barometric sensors 677, 678 can also be provided, for example on the controller motherboard or similar control processor circuit 660. The controller 660 can thus utilize a dynamic algorithm or recipe for controlling the pump 626 and lighting elements 655, based not only on plant type but also adaptable to modulate the lighting and irrigation cycles based on growth stage, environmental conditions, and other scheduling and control parameters, as described herein.

The support 640 is coupled to the base 620 to support the light assembly 630, and can be adapted to adjust the height of the lighting elements 655 relative to the plant tray 622 and plants 200. An automated telescoping actuator 645 can be coupled to the support 640 in communication with the controller 660, and adapted to adjust the height of the lighting elements 655 based at least in part on the plant type or growth stage.

The controller 660 includes a computer processor, central processing unit (CPU), or microprocessor (µP) 662 adapted to perform control functions for system 600, in combination with memory 663 and in communication with the pump 626 and level sensor 628, the lighting system 650 and lighting elements 655, the camera 670, optical sensors 675, and one or more additional environmental sensors including ambient temperature sensor 677 and humidity sensor 678. Power connections can be made with an external power port, using an internal bus for data communications as shown in FIG. 2. One or more additional connectors can also be provided between the reservoir 610 and the base 620 or support 640, in order to connect the pump 626 to the bus as described.

The controller 660, processor 662 and interface 664 are configured with a combination of hardware, software and firmware adapted for controlling the pumping cycle (or irrigation cycle) of the pump 626, and for controlling the timing, intensity and spectrum of light generated by the lighting elements 655. The software can also include artificial intelligence (e.g., a machine learning algorithm) adapted to automate various tasks, such as, for example, identifying plant species, predicting harvest times, developing nutrient profiles, identifying plant diseases, mold, pests, insects, generating plant care suggestions, creating custom pod packs, and the like.

The interface 664 is adapted for communicating with a smart phone, tablet, mobile device, personal computer, smart home device or other external user device 300. For example, the apparatus 100 can communicate with smart home devices such as Google Home and Amazon Alexa, allowing users to check on the status of the plants in their garden, or to activate certain features of their garden (e.g., watering plants, capturing image, etc.) through a series of voice commands. Suitable communication protocols include, but are not limited to, a Wi-Fi connection, a BLUETOOTH, ZIGBEE, Z-WAVE or similar communication standard, near-field communications (NFC), a wireless or cellular network, or a hard-wired network connection.

Using the camera 670 or other suitable optical sensors, gardening system 600 can detect the plant type and plant height, size and growth stage of the plants 200, and adapt the irrigation and light cycles accordingly. Depending on design, the fluid flow and light spectrum can be determined according to plant type, and dynamically modulating in real time using a recipe or algorithm based on growth stage, water supply, and environmental conditions including ambient light exposure, ambient temperature, and ambient humidity. The dynamic control algorithm can include any combination of control indicators and scheduling features disclosed herein, based on dynamic plant and growth stage identification and ambient condition information as described below.

Plant Imaging, Identification and Growth Stage Communication

As shown in FIG. 6, gardening system 600 includes a digital camera 670 adapted to generate image data representing plants 200. The controller 660 includes a control processor 662 in communication with an interface 664, which is adapted for communicating the image data generated by camera 670 with a user device 300.

For example, the camera 670 can be configured for a preselected or default time-lapse image rate of one, two, three, four or more images per day, or to operate at a user-selected period. In particular, camera 670 can be adapted to provide time-lapse or still images showing germination, leafing, flowering, fruit production, and other stages of plant growth. A digital video camera 670 can also be used, with still image, time-lapse and live feed capability. The light spectrum and intensity can be adjusted for image quality, for example by modulating the spectrum to generate images with all of the lighting elements 655 activated, or with a selection of red (low frequency), blue (high frequency), and white (broad spectrum or middle frequency) components. The camera can also be configured to use multispectral imaging technology, which uses green, red, red-edge and near-infrared wavebands to capture images of plants and vegetation. For example, because growing, active vegetation primarily reflects near-infrared light, they are highlighted and easily distinguished in color-infrared film. Replacing the current RGB (red-green-blue) camera 170 with a black and white, IR (infrared) or hyperspectral camera can give in-depth and non-destructive analysis of the plants, including but not limited to the photosynthesis rate, nitrogen content, and secondary metabolite information.

The camera 670 can also be adapted to identify the plant type in communication with the controller 660 and processor 662; e.g., based reading an indicia on the respective modular insert 210 or 510. Suitable indicia include bar codes, 2D codes, and other optical data formats, as well as machine-readable radio-frequency, inductive or capacitive coding systems suitable for gardening system 600 to determine the type or variant of the respective plant or plants 200 grown from a particular insert. Once the camera or other sensor has imaged the indicia, the resulting image data or code can be processed by the processor 662 to identify the plant type by comparing with type codes stored in the memory 663, where the type codes relate the indicia to particular plant types.

The camera 670 and processor 662 can also be configured to determine the plant time by image recognition, including digital phenotyping and similar digital analysis of the image data. The control processor 662 can be adapted for processing the image data to determine the number and size of leaves, calculate the leaf-area index (LAI), or to determine the size and number of fruits or flowers, and to perform segmentation and other digital phenotyping processes based on the analyzed data. In these embodiments, the analyzed data can be compared to a database of representative plant type and growth stage characteristics stored in the memory 663, or utilizing network or cloud-based resources available via interface 664.

A suitable camera 670 can also be adapted to detect the size and height of plants 200, and to generate plant growth stage signals for transmission by the interface 664. Suitable plant growth stage signals based on the processed image data include, but are not limited to, germination of plants 200 from the inserts, branching, leafing out, and flowering of the plants 200, and growth of fruit on the plants 200, as reflected in the images taken by the camera 670, when digitally processed by the control processor 662. The user device 300 can also be adapted to identify the plant type by imaging the indicia on the modular plant insert, and for growth stage identification and digital phenotype analysis based on the processed image data.

The control processor 662 and interface 664 can also be configured to generate predicted harvest dates based the plant growth stage signals. For example, the processor 662 can be configured for determining a harvest window, harvest period or other harvest indicator, based on the digital phenotype data including identified leaf, flower or fruit components, or for the plant as a whole. The plant growth stage signals and harvest indicators can be used to generate additional user reports by sending a combination of text, visual, audio or haptic alert signals to the user device 300 via the interface 664, along with still or time-lapse image data demonstrating the reported plant growth stage. Ambient condition reports can also be generated, for example high or low humidity or temperature-range-based user alert communicated by the user device 300, in response to information generated by the control processor 662 and transmitted via the interface 664.

More generally, apparatus 100 can be adapted to prepare and report a plant health profile describing the growth and health state of the plants 200. The image data can be used in tandem with sensor data to create a plant health profile, highlighting the areas in which the plant is thriving or demanding more attention. Additionally, through digital twinning, physical plants 200 can be mapped to a digital platform, where data on productivity, condition, and harvest status can be collected in a database of individual plant history. The control processor 662, memory 663, interface 664 and camera 670 are utilized to collect, store and transmit a range of data including, but not limited to, plant image data reflecting the growth state and health conditions of the plants 200, water consumption by the plants 200, light intensity, and wavelength and exposure data for the spectrum generated by lighting system 650, based on which elements 655 are activated at each time in the record, operating at their known wavelength range (e.g., white, red or blue).

Temperature, humidity and ambient light data can also be included, as obtained from the optical sensor 675 and environmental sensors 677 and 678. The control processor 662 can execute an algorithm for creating the plant health profile based on these data, including additional analysis of image data from the camera 670 to detect insects, pests, rust, mold, blight, fungus, infections and plant diseases, to determine appropriate times for pruning, removing any cap or dome structures from the plant tray or insert (if present), and to generate harvesting indicators, as described herein.

In smart device applications, the user device 300 can be (or connect to) a personal assistant system or other smart home device, in order to provide access to the health profile data via voice commands and cloud connections. Using a personal assistant system or similar smart user device 300, the user can simply ask the device 300 to receive information on the health profile of the plants 200, how much fluid is left in the reservoir 610, when next to add water, when the plants will be ready for harvest, and any other desired information, using voice commands to control the gardening system 600 and perform other desired user interactions.

The controller 660 and processor 662 are also adapted to modulate the irrigation cycle of the pump 626 and the light cycle of the lighting elements 655 based on any combination of the plant type, growth stage, plant size, height, fluid level, health report, and ambient sensor data. In particular, the controller 660 and processor 662 can be configured to modulate fluid flow from the pump 626 and the timing, intensity and spectrum of light generated by the lighting elements 655 over a periodic cycle, and to dynamically change the irrigation and light cycles based on these factors. The underlying periodic cycle can be daily, diurnal, nocturnal, or crepuscular, or a combination thereof.

Light Cycle Scheduling and Control

The lighting elements 655 can provide the desired spectral contributions in the red, orange, yellow, green, cyan, blue and violet ranges, as well as the near infrared and near ultraviolet. Suitable lighting control indicators and light cycle scheduling parameters include, but are not limited to, the following.

Light On-Time: The controller 660 can be adapted to activate or turn on one or more (or all) or the lighting elements 655 at or for a particular time based on a light-on time indicator, or similar control parameter. For example, the controller can use a selected light-on time indicator or other suitable control parameter to control, change or modulate the intensity of the light spectrum to which the plants 200 or inserts (or both) are exposed, or to determine the exposure duration, either independently or in combination, while maintaining the overall spectral shape or spectral profile; e.g., as a function of frequency, normalize for total intensity.

Light Off-Time: The controller 660 can be adapted to deactivate or turn off one or more (or all) of the lighting elements 655 at or for a particular time based on a light-off time indicator, or similar control parameter. For example, the controller can use a selected light-off time indicator or other suitable control parameter to control, change or modulate the intensity of the light spectrum to which the plants or inserts (or both) are exposed, or to determine the exposure duration, either independently or in combination, while maintaining the overall spectral shape or spectral profile.

White Light Intensity: The controller 660 can be adapted to brighten or dim one or more (or all) of the lighting elements 655 at or for a particular time based on a white-light intensity indicator, or similar control parameter. For example, the controller can use a selected white-light intensity indicator or other suitable control parameter to control, change or modulate the overall intensity of the light spectrum to which the plants or inserts (or both) are exposed, while maintaining the overall spectral shape or spectral profile. Alternatively, the controller can use such a parameter to control, change or modulate a selected white-light component of the light spectrum, while maintaining an independent red (lower frequency), blue (higher frequency) or yellow/green (middle frequency) component, as described herein.

Red Light Intensity: The controller 660 can be adapted to brighten or dim one or more selected lower or middle-frequency lighting elements 655 based on a red-light intensity indicator, or similar control parameter. For example, the controller can use a selected red-light intensity indicator or other suitable control parameter to control, change or modulate a red light (lower frequency) component of the light spectrum to which the plants or inserts (or both) are exposed, either independently or in combination with other middle frequency (green, yellow or cyan) or higher-frequency (blue, violet or ultraviolet) components. Depending on design, the red (low-frequency) component may extend down from the middle-frequency (cyan, green or yellow) range to the lower-frequency (orange or red) range, or lower. Suitable red light spectrum components can thus include wavelengths of about 485-500 nm (cyan) and above, about 500-565 nm (green) and above, about 565-590 nm (yellow) and above, about 590-625 nm (orange) and above, or about 625-740 nm (red) and above. In some systems, the lower-frequency red light component extends into the infrared or near-infrared range, above about 740 nm in wavelength.

Blue Light Intensity: The controller 660 can be adapted to brighten or dim one or more selected middle or higher-frequency lighting elements 655 based on a blue-light intensity indicator, or similar control parameter. For example, the controller can use a selected blue-light intensity indicator or other suitable control parameter to control, change or modulate a blue light (higher frequency) component of the light spectrum to which the plants or inserts (or both) are exposed, either independently or in combination with other middle-frequency (cyan, green or yellow) and lower-frequency (orange, red or infrared) components. Depending on design, the blue (high-frequency) component may extend up from the middle-frequency (cyan, green or yellow) range to the higher-frequency (blue or violet) range, or higher. Suitable blue light spectrum components can thus include wavelengths of about 565-590 nm (yellow) or lower, about 500-565 nm (green) or lower, about 485-500 nm (cyan) or lower, about 450-485 nm (blue) or lower, or about 380-450 nm (violet) or lower. In some systems, the higher-frequency blue light component extends into the ultraviolet or near-ultraviolet range, below about 450 nm in wavelength.

White Light On/Off: The controller 660 can be adapted to turn on (activate) or turn off (deactivate) one or more (or all) of the lighting elements 655 based on a white light on/off indicator, or similar control parameter. For example, a suitable controller can be adapted to control, change, pulse or otherwise modulate the intensity of the light spectrum to which the plants or inserts (or both) are exposed based on such a white light on/off parameter, while maintaining the overall spectral shape or spectral profile. Alternatively, the controller can use such a parameter to turn on or off a selected white-light component of the light spectrum, while maintaining an independent red (lower frequency), blue (higher frequency) or yellow/green (middle frequency) component, as described herein.

Red Light On/Off: The controller 660 can be adapted to turn on (activate) or turn off (deactivate) or more selected lower or middle-frequency lighting elements 655 based on a red light on/off indicator, or similar control parameter. For example, a suitable controller can use such a parameter to control, change, pulse or otherwise modulate the red light (lower frequency) component of the light spectrum to which the plants or inserts (or both) are exposed, as described herein, either independently or in combination with other middle frequency (green, yellow or cyan) or higher-frequency (blue, violet or ultraviolet) components.

Blue Light On/Off: The controller 660 can be adapted to turn on (activate) or turn off (deactivate) or more selected middle or higher-frequency lighting elements 655 based on a blue light on/off indicator, or similar control parameter. For example, a suitable controller can use such a parameter to control, change, pulse or otherwise modulate the blue light (lower frequency) component of the light spectrum to which the plants or inserts (or both) are exposed, as described herein either independently or in combination with other middle frequency (green, yellow or cyan) or higher-frequency (blue, violet or ultraviolet) components.

Each of these lighting control indicators and light cycle scheduling parameters can be selected based on type or variety of the respective plants 200; e.g., based on identification of the insert 210 or 510, as described herein. The gardening system controller 660 and processor 662 can also be adapted to modulate the spectrum over a growth cycle based on the plant type, using the control indicators and parameters to define a dynamic, plant-specific recipe or control algorithm. For example, the growth cycle may extend for a period of at least one week, over which the selected spectrum is modulated based on the plant type. The controller 660 can also be adapted to dynamically change, control or modulate the lighting intensity, lighting spectrum, lighting exposure and/or lighting duration generated by the lighting elements 655 using any combination of the above parameters, as adapted for the particular of plant type, plant size, height, plant growth stage, time of day, or time since planting the inserts.

Pump and Water Cycle Scheduling and Control

The above control indicators and scheduling parameters can also be adapted for operating the pump 626, and for controlling the associated water cycle and irrigation schedule. The base pump operation and irrigation cycles can be daily, diurnal, nocturnal, crepuscular, or a combination thereof. The controller 660 and processor 662 are further adapted to dynamically modulate the pump and irrigation schedule over the growth cycle of the plants 200 and pods or inserts 210 or 510, based on any of the plant health and ambient condition data. Suitable pump control indicators and irrigation cycle parameters include, but are not limited to, the following:

Pump On-Time: The controller 660 can be adapted to turn on or activate the pump 626 at or for a selected time based on a pump-on time indicator, or similar control parameter. For example, the controller can use a selected pump-on time indicator or other suitable control parameter to control, change or modulate the operation of the pump 626, in order to deliver fluid from the reservoir 610 to the plants and inserts in the plant stage or plant tray 622.

Pump Off-Time: The controller 660 can be adapted to turn off or deactivate the pump 626 at or for a selected time based on a pump-off time indicator, or similar control parameter. For example, the controller can use a selected pump-off time indicator or other suitable control parameter to control, change or modulate the operation of the pump 626, in order to stop or pause delivery of fluid from the reservoir 610 to the plants and inserts in plant tray 622.

Pump Cycle Time: The controller 660 can be adapted to turn on and off (or activate and deactivate) the pump 626 at selected times and for selected durations, based on a pump cycle time indicator or similar control parameter. For example, the controller can use a selected pump cycle time indicator or other suitable control parameter to change the operation of the pump 626, in order to start, stop, maintain or pause delivery of fluid from the reservoir 610 to the plants and inserts 210 in plant tray 622.

The pump on time, off time and pump cycle time parameters can be selected based on a plant-type specific irrigation schedule; e.g., to provide a controlled amount of fluid from reservoir 610 to the plants and inserts, or to provide a predetermined fluid flow to plant tray 622, for a preselected time. The pump on time, pump off time and pump cycle parameters can be varied based both on plant type or variety and on the plant growth stage, for example to provide higher levels of irrigation to water-intensive plants or during earlier periods of high growth, or both. Similarly, the pump on time, pump off time and pump cycle parameters can be varied based both on plant type or variety and on plant growth stage to provide lower levels of irrigation to less water-intensive plants or during later periods of lower growth, or both.

As the pump 626 recirculates fluid from the reservoir 610 to the plant tray 622 and through the plant inserts, unconsumed nutrients are re-cycled for use by the plants. As the fluid flow passes through the organic substrate in the modular inserts (pod inserts 210 or tray inserts 510), the encapsulated nutrients are released in a slow or controlled manner over time, and either used by the adjacent plant or cycled through the reservoir 610. The pump module 626 recycles the same nutrient-laden fluid back through the plant tray 622, and back through the organic substrate, for better growth efficiency with reduced nutrient loss.

Dynamic, Ambient Condition and Growth-Stage Based Control

The automated gardening system 600 can be further adapted to change, control or modulate the light and water cycle schedule according to a dynamic algorithm or recipe based on ambient lighting and environmental conditions including, but not limited to, ambient light intensity, ambient light spectrum, ambient temperature, and ambient humidity. Local position (geolocation) and seasonal information data can also be used, for example latitude, longitude, elevation, calendar date, sunlight hours, and local sun angle. In some embodiments, the location information can be determined from a global positioning system (GPS) interface in data communication with the system controller 660. Alternatively, an external GPS device can be provided, for example in user device 300, or an internet-based or user-provided location can be used.

The camera 670 or optical ambient light sensors 675 can be used to detect the intensity and spectrum of ambient light incident on the plants and or inserts (or both), and to adapt the light spectrum and exposure duration accordingly. Similarly, the water cycle parameters can be modified to generate increased or decreased irrigation of the plants and inserts, depending data from suitable temperature and humidity sensors 677 and 678, or based on altitude. More generally, both the water and light cycles can be adapted based on a combination of ambient light, temperature, humidity, altitude, local weather data including precipitation and barometric pressure data, and other environmental and location data.

The camera 670 or optical sensors 675 can be adapted to sense ambient light conditions in the location of the gardening system 600. In these examples, the controller 660 and processor 662 can be further configured to modulate the spectrum generated by LEDs or other lighting elements 655 based on the sensed ambient light conditions. Similarly, the camera 670 and/or optical sensors 675 can also be adapted to identify a stage of the growth cycle, with the controller 660 and processor 662 configured to modulate the lighting cycle or spectrum based on the plant growth stage.

In some designs, the red (low-frequency), yellow/green (middle frequency) and blue (high frequency) control parameters can be varied to produce a preselected light spectrum, intensity and exposure, including contributions from ambient lighting. The ambient light sensors can be adapted for sensitivity to both the intensity and spectrum of the ambient light, and to distinguish between higher and lower levels of incandescent lighting, fluorescent lighting, halogen lighting, LED lighting including solid state, liquid, polymer and organic LED elements, laser lighting elements, plasma lighting elements, and direct and indirect sources of natural light. The controller can be adapted to adjust the light spectrum, intensity and exposure time accordingly, in order to provide a selected lighting schedule based on a dynamic algorithm or recipe that accounts both for light generated by the lighting elements 655 of lighting system 650, and ambient lighting conditions.

The light cycle and water cycle can also be adapted based on plant growth stage, for example using the camera 670 or other optical sensors to detect the size and height of plants 200, and/or to detect growth cycle signals such as germination from the inserts 210, and one or more of branching, leafing out, and flowering of the plants 200. In each of these stages, the water and lighting cycle parameters can be adapted accordingly. Growth cycle signals can also be used to generate user reports, for example by sending a combination of text, visual, haptic or audio alerts and still or time-lapse image data demonstrating the reported plant growth stage. In some applications, one or both of the lighting spectrum and pump cycle can be modulated based on other user parameters, for example a preferred growth rate, a preferred coloration of the plant (or of leaves, flowers or fruit of the plant), a desired phytochemical content, or for taste preference, for example by modulating for more or less water or more or less light to provide sweeter, hotter, milder, sharper or more bitter flavors in the leaves, flowers or fruit of the plants; e.g., by phenotypic induction of such properties in the plants 200, or otherwise by selectively controlling the stress on plants 200 during the growth cycle. By adjusting the lighting color, the garden apparatus 100 can customize the taste of the plants according to the user's taste profile.

The control processor 662 can also be configured to determine an elapsed time between user interactions via the interface, and to modulate one or both of the spectrum and the fluid flow according to a default or offline mode, based on the elapsed time. For example, the processor 662 can be configured to operate in an offline, online or holiday mode based on the elapsed time and calendar date, including economy and reduced consumption modes where the light and irrigation cycles are modified to reduce water consumption in the event the users are travelling, or if there are no user communications for an extended (e.g., holiday) period.

In advanced mode operations, the control processor 662 can allow the user to input custom or user-selected growing algorithms and recipes via the interface 664, including on/off timing indicators for controlling the pump 626 and lighting system 650, and irrigation, brightness, intensity and exposure parameters with duration and frequency instructions selected from any combination of the light cycle and irrigation control indicators and scheduling parameters described herein.

Voice control, text and menu-based or button-based commands can also be used, for example using the device 300 to communicate with the controller 660 to modulate the selected light and water cycle parameters to provide relatively more or less irrigation, light intensity, or exposure, or to modify the spectral composition toward red, blue, or in the middle range. Alternatively, such commands can be used to override the selected light and water scheduling according to a selected algorithm or recipe, for a selected period of time. In additional examples, the interface 664 is adapted for communications between gardening system 600 and a personal assistant or other smart user device 300, for a combination of voice control, text, menu-based and button-based control communications with gardening system 600. Gardening system 600 may also communicate control communications with the user device 300, for example to verify or adjust ambient lighting, ambient temperature, and ambient humidity, at user discretion.

Methods of Operation

Figure 7:
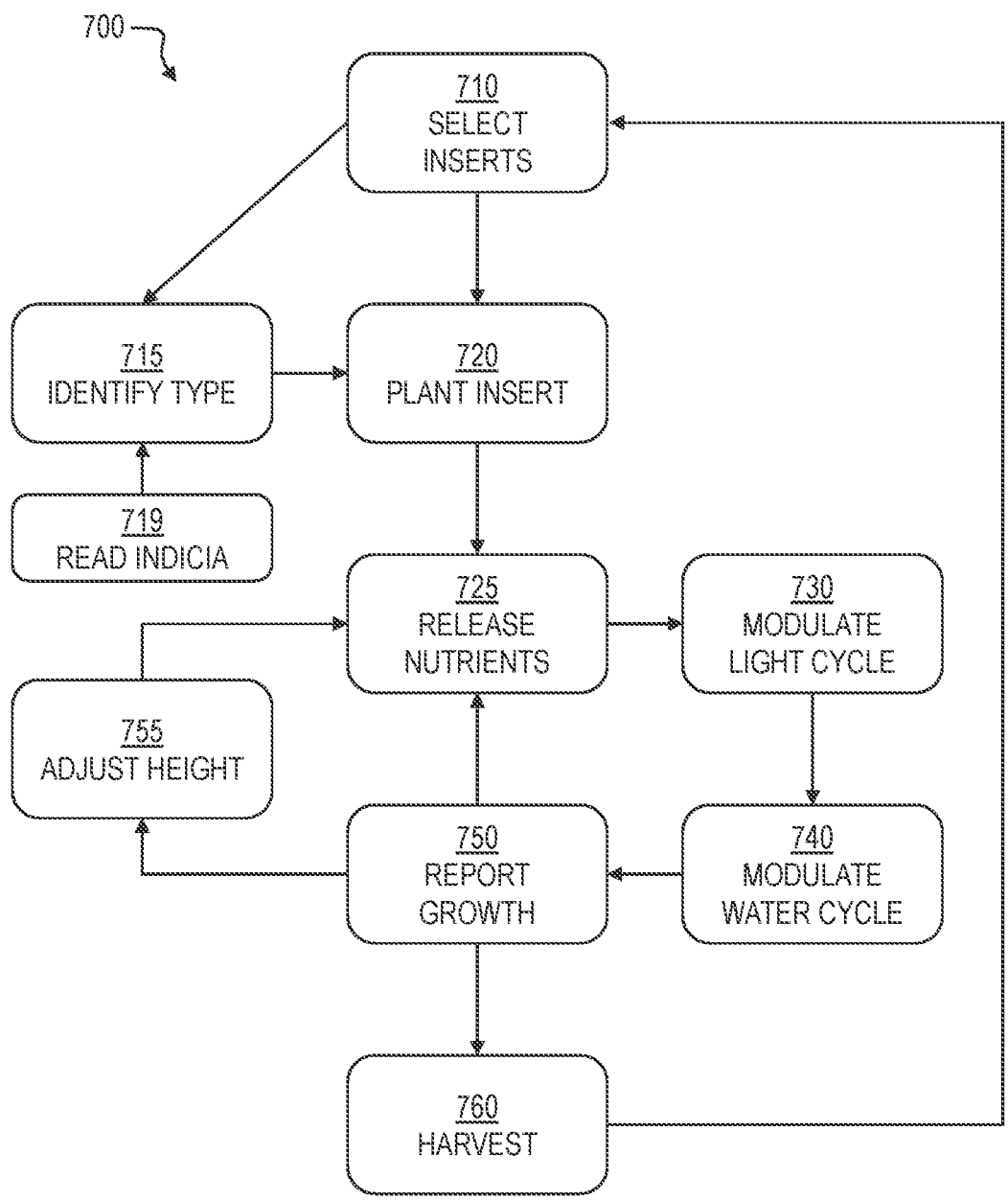
FIG. 7 is a block diagram of a method for operating the automated gardening system and apparatus.

FIG. 7 is a block diagram of a method 600 for operating an automated gardening system or apparatus. Method 600 can be applied to operate examples of an automated gardening apparatus 100 according to any of FIGS. 1-3 and 4A-4b, or to operate an automated gardening system 600, as shown in FIG. 6.

As shown in FIG. 7, method 700 includes one or more of selecting (710), identifying (715) and planting (720) one or more types or varieties of plant, for growth in an automated gardening system. The plant type or variety can be determined or identified (715) before or after planting (720), for example by reading an optical bar code or similar indicia (719). Suitable indicia include, for example, optical bar codes, 2D bar codes, quick response (QR) codes, and machine-readable characters or images. Alternatively, a radio-frequency, inductive or capacitive coding system can be used.

In these examples, a camera can detect the QR code or other indicia on the pod or insert, or on a sticker or similar label on top of each insert. The apparatus can be connected to a wireless network to determine the plant type by looking up the codes over the internet or other network, or they may be stored in local memory (or both). Alternatively, machine-based vision and computer imaging can be used to determine the plant type and growth stage, as described herein. In addition to identifying the plant species, artificial intelligence can be used to predict harvest time, and to detect and/or identify plant diseases, mold, pests, and insects, which can furthermore be used to create optimal plant care suggestions. In each of these examples, the controller will automatically populate with data based on the plant type associated with the pod, and this information can be used to modulate the lighting and irrigation cycles according to the selected recipe or algorithm.

The insert or pod can be configured to release nutrients (725). The nutrient formula can be selected based on plant type and growth requirements, and released continuously or in a controlled fashion over the growth cycle of the plant. Different nutrients can also be released at selected times in the growth cycle based on plant-specific time-release nutrient formulae.

An automated controller can be provided to modulate one or both of the lighting cycle (730) and the irrigation or watering cycle (740). The user can then be informed of progress by reporting plant growth (750), for example by communicating images of the plants to a user's mobile device. Depending on the plant growth stage, height of the light assembly can be adjusted (755), and plants (or portions of the plants) can be harvested (760) when a suitable plant growth stage is determined, or at a time of convenience for the user. These processes can be performed in any order or combination, with or without additional process steps.

Depending on application, communication (750) can include communication of image data showing plant growth, using a camera mounted to the light assembly. If the user does not communicate for any period of time, the system will continue to run in automated mode. If the device is unable to generate a network connection, the lighting and watering cycles will be maintained base on the most recent plant type information available.

There is also a default mode, for example where no plant type or plant growth stage information is available, providing for a broad-based light spectrum and irrigation cycle, suitable to a range of different plant types. In the event a user does not connect to or communication with the gardening apparatus for an extended period, the apparatus can still provide automating light and watering cycles selected for autonomously growing plants. Across these different operating modes, the software, firmware and hardware can be configured for the gardening system or apparatus to dynamically vary the lighting and irrigation cycles by using machine vision and/or sensing one or more of the plant type, plant growth stage, temperature, humidity and ambient light conditions, and automatically modulating the lighting spectrum and pump cycle accordingly, using any of the algorithms, recipes, control indicators and scheduling parameters described herein. These intelligently created recipes can be used in vertical farms and commercial greenhouses.

Networked System Applications

Figure 8:
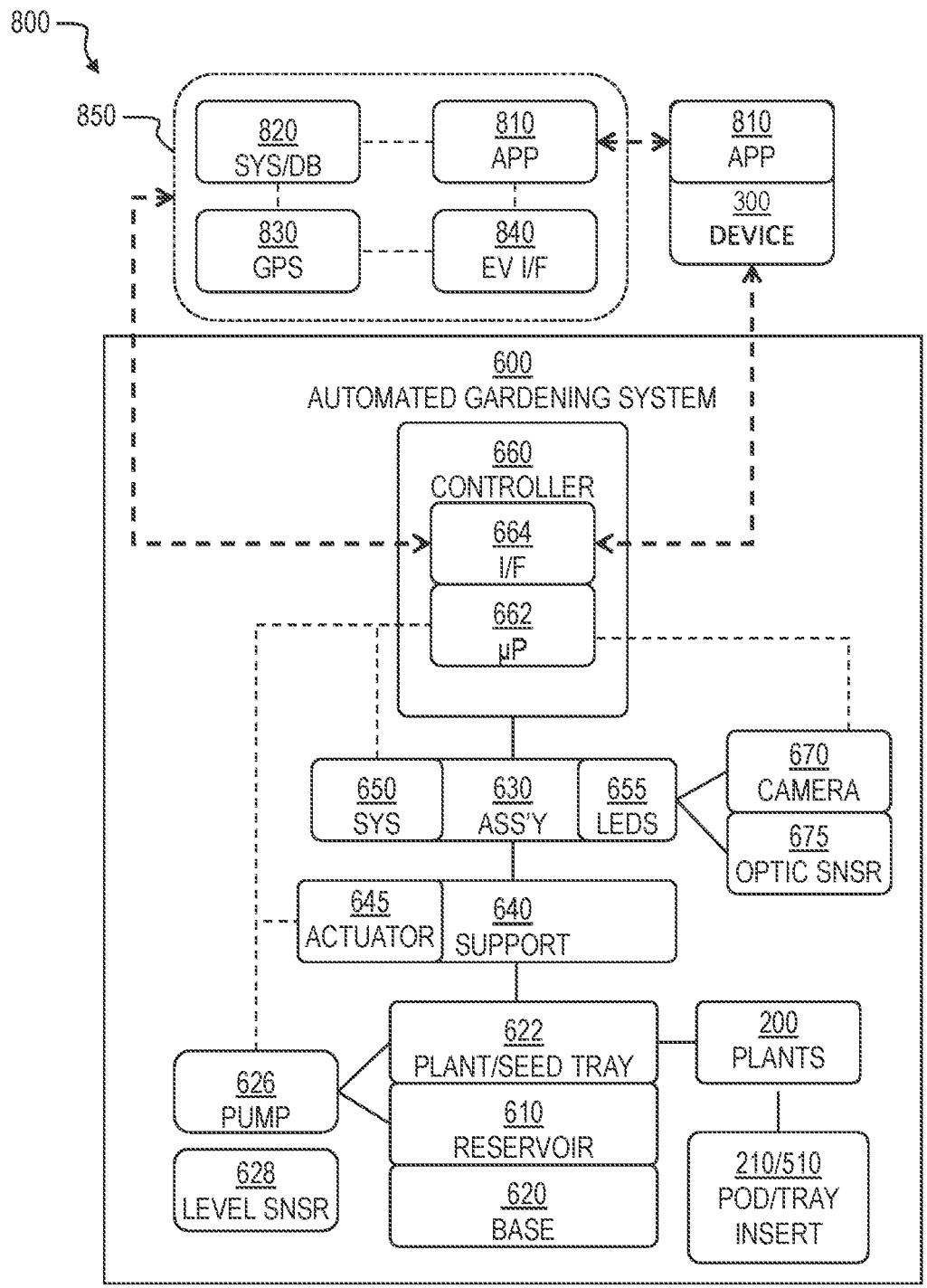
FIG. 8 is a block diagram of a distributed network system for an automated gardening apparatus, including one or more user devices and networked or cloud-based components.

FIG. 8 is a block diagram of a distributed network system 800 for an automated gardening apparatus 100 or system 600, including one or more user devices 300 and a networked or cloud-based mobile user application 810. User device 300 is adapted to execute the mobile application 810 for communicating data and control information between device 300 and system 600, and between device 300 and one or more cloud-based components including a gardening database and operating system (DB/OS) 820, a global positioning system (GPS) 830, and an environmental data interface (EV I/F) 840.

Figure 9:
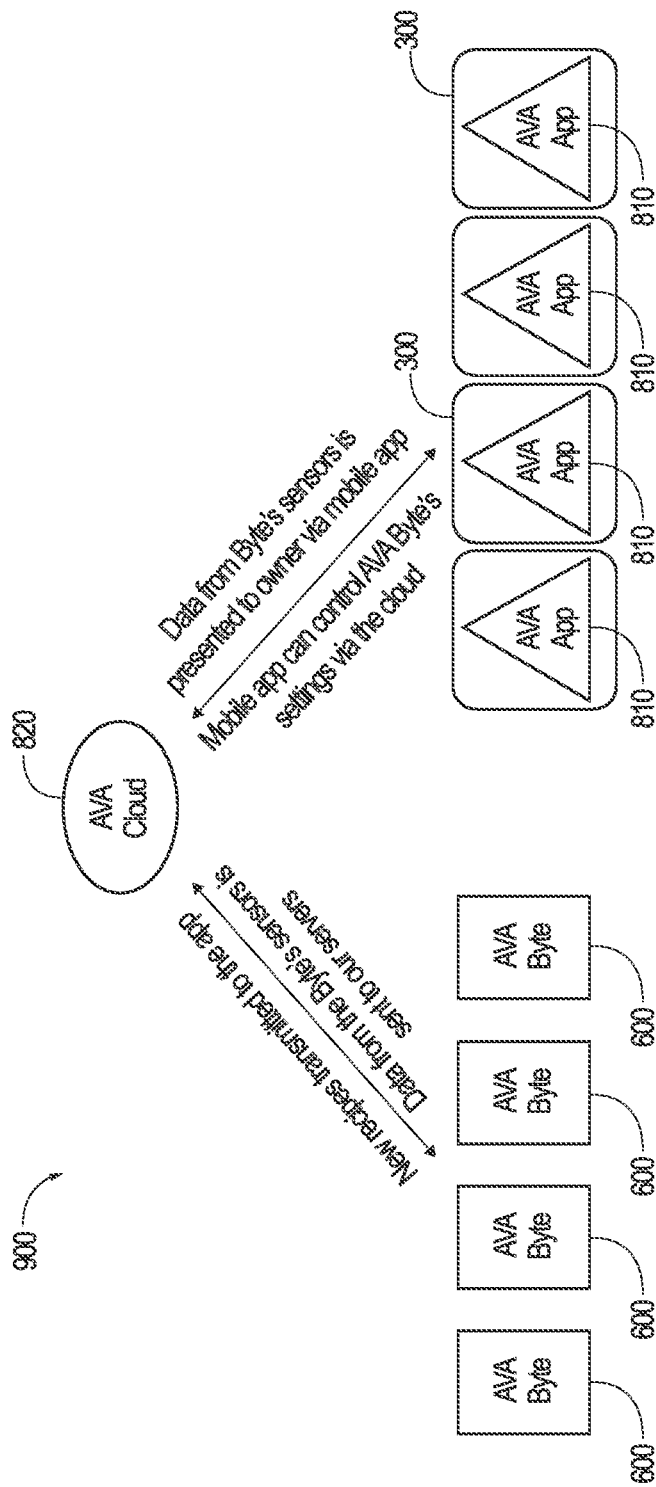
FIG. 9 is a system architecture diagram for operating an automated gardening apparatus, showing communications between the apparatus, user device, and networked or cloud-based components.

The mobile application 810, gardening database and operating system 820, GPS system 830 and environmental data interface 840 operate as a network or cloud-based gardening information system or server 850. While the application 810 is shown as part of the network or cloud-based server system 850, components of the application 810 may also execute on the user device 300. More generally, components of the application 810 operate both on the user device 300, and in the server system 850. The server system 850 can also communicate directly with the gardening system 600 with the user device 300 is remote, as shown in FIG. 9.

As shown in FIG. 8, one or more components for operation of the gardening system 800 can be provided in the cloud-based or network-based server system 850, including the gardening database and operating system 820, a GPS system 830, and an environmental interface 840. The gardening database and operating system 820 provides memory for storing plant type information, growth stage information, phenotyping data, and plant identification data, as described herein, and the gardening database and operating system 820 is configured for communicating this information with the user device 300 and gardening system 600; e.g., via the mobile application 810. The gardening database and operating system 820 also provides memory for storing control indicators and scheduling parameters for operating system 600 according to selected irrigation and light cycle recipes and algorithms, as described herein, and the gardening database and operating system 820 is configured for communicating this information with the user device 300 and system 600; e.g., via the mobile application 810.

The GPS system 830 is adapted for determining local position and timing data for communication with the user device 300 and system 600; e.g., via application 810. The position and timing data can include, but are not limited to, universal time, local time, latitude, longitude, altitude, and direction or orientation (e.g., orientation of the plants 200 or plant tray 200 relative to the sun, or with respect to a natural or artificial light source. The location information can be provided based on proximity to the gardening system 600, for example by communication with the user device 300 when adjacent the system 600, or via communication with a local positioning device provided with the system controller 660.

Environmental data interface (EV I/F) 840 is adapted for communicating environmental information with the user device 300 and system 600; e.g., via application 810. The environmental information can include, but is not limited to, ambient temperature, ambient humidity (relative or absolute, or both), ambient pressure (absolute atmospheric pressure or barometric pressure, or both), and combinations thereof. For example, the ambient environmental data can be defined or determined in or for a position local to system 600, and at a time of operation of the system 600, as determined according to the position and timing information communicated with GPS interface 830. Additional environmental data include, but are not limited to, accumulated precipitation and/or predicted precipitation; e.g. for a period or one or more hours, days, weeks or months before or after the current time operating time according to GPS interface 830. Additional relevant environmental information include recorded and predicted temperature, humidity, and barometric pressure, over similar time scales.

Device 300 executes application 810 to communicate information from the database 820, GPS interface 830, and environmental data interface 840 with the controller 600. The plant identification and growth stage information communicated from the database 820 can be used to select plant and growth stage-specific irrigation and lighting algorithms and recipes for operation of the system 600, as determined by one or both of the user device 300 and the system controller 660. The additional position and environmental information communicated from the GPS interface 830 and environmental interface 840 can be used to dynamically change, adjust or modulate the selected recipes and algorithms for the irrigation and light cycles, using any one or more of the control indicators and scheduling parameters described herein.

System Architecture

FIG. 9 is a system architecture diagram for operating a gardening apparatus 100 or gardening system 600, as described herein. As shown in FIG. 9, a networked or cloud-based gardening information server system 850 communicates with one or more automated gardening systems 600, for example a number of individual gardening systems

600, or one or more systems 600 distributed in a vertical ecosystem, using one or more wall mount accessories. The user devices 300 can each execute a user application 810 for communication with one or more respective gardening systems 600, via the networked server system 850.

FIG. 9 shows the user devices 300 remote from the respective gardening systems 600, with communications via the networked server system 600. Sensor and image data from the various environmental, optical, and camera sensors on each system 600 (or "Byte") are communicated between the system 600 and the server system 650, for example using a wired or wireless internet link, or other network link as described herein. The sensor and image data can also be communicated between the server system 650 and the one or more respective user devices 300, using a similar wired or wireless link.

The user devices 300 execute the mobile application 810, in order to display the image data and communicate the sensor data to a respective user. Based on the image and sensor data, user preference, or a combination of data and user preference, the user can control the irrigation and lighting cycle of the respective gardening system 600, for example by selecting one or more control recipes or algorithms, or by modifying the system operating according to a user-selected control indicator or scheduling parameter, as described herein.

The server system 850 can transit control recipes and algorithms to the respective system 600, either based on the user selection or automatically, using the plant type and growth phase information. Similarly, the server system 850 can transmit user-selected control indicators and scheduling parameters, or dynamically modulate or adjust the control recipes or algorithms in real time, based on the camera image data, environmental sensor data, location, and environmental information, as described above.

The user devices 300 can collect users' feedback on different pods or pod packs based on a post-harvest survey in the mobile application 810. AI predictive pod pack ordering can generate a list of pod packs that the user may want to order based on the user feedback (e.g., based on the results of their previous harvest).

Operational Flow

Figure 10:
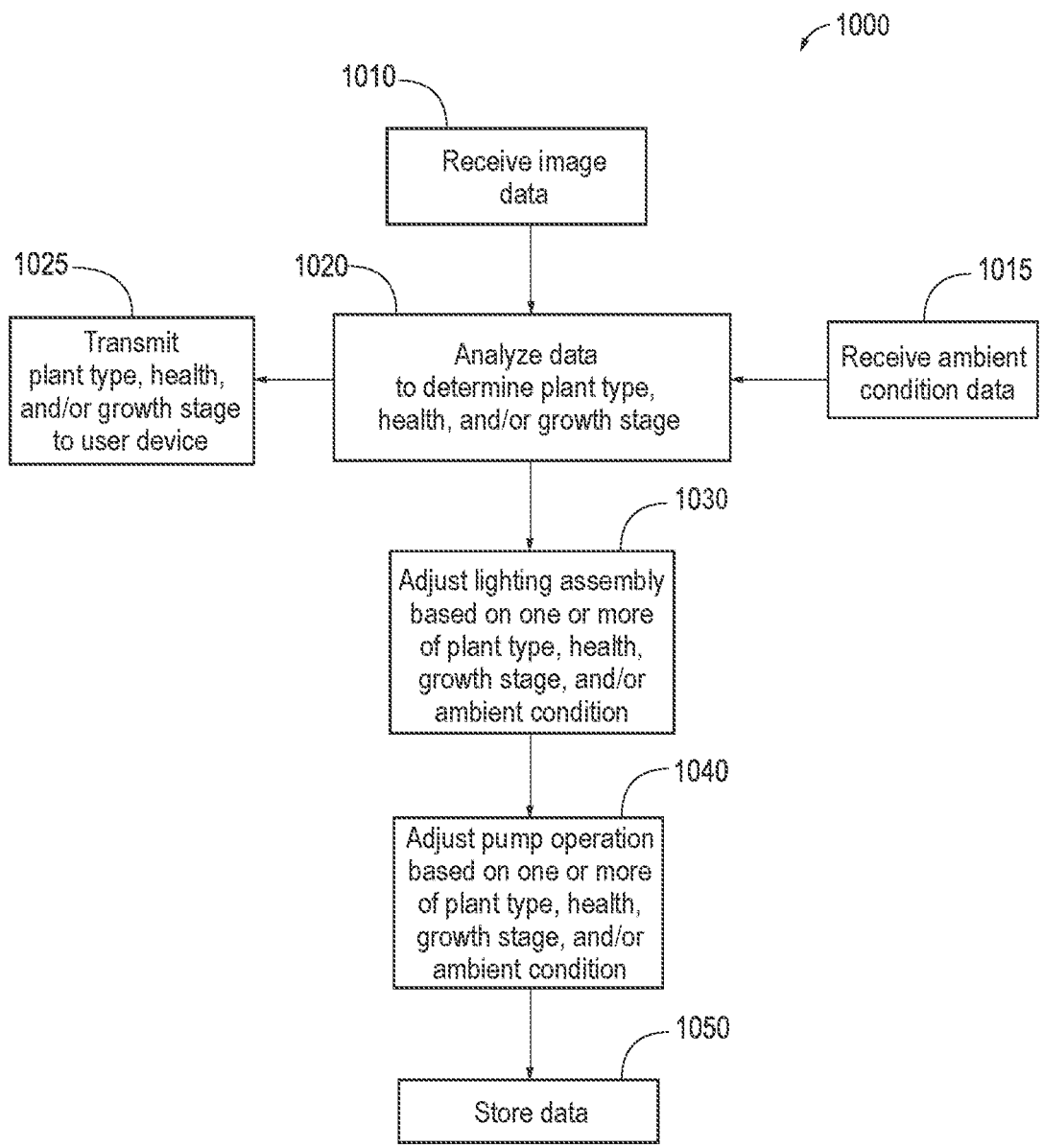
FIG. 10 is a flowchart illustrating a method for automating gardening of one or more plants.

FIG. 10 is flow chart illustrating a method for automating gardening of one or more plants. The method 1000 can begin with operation 1010, and image data is received. For example, image data related to the one or more plants is received by a processor from a camera in data communication with the processor. As one particular example, the image data can include images of the one or more plants. In another example, the camera can be adapted to provide time-lapse or still images showing germination, leafing, flowering, fruit production, and other stages of plant growth. A digital video camera can also be used, with still image, time-lapse and live feed capability. As another example, the image data can include an image of machine-readable indicia provided on one or more plant inserts that include the one or more plants. In additional examples, the image data can include an image of indicia such as bar codes, 2D scanning codes, color coding, machine-readable text, and other optical data formats readable by the processor.

The method 1000 can also begin with operation 1015, in which ambient condition data is received. For example, ambient condition data can be received by the processor from one or more sensors in data communication with the processor. In some examples, the sensors can be positioned proximate the one or more plants and can include one or more of an ambient light sensor, a fluid level sensor, a temperature sensor, a humidity sensor, and a barometric sensor. The ambient condition data can include data related to at least one of temperature, humidity, pressure, light exposure, or reservoir fluid level, or a combination thereof.

After operations 1010 and/or 1015, the method 1000 can proceed to operation 1020, in which the data received by the processor (e.g., the image data and/or ambient condition data) is analyzed to determine plant type, health, and/or growth stage. For example, the processor can analyze the image data with image recognition techniques including digital phenotyping or other digital analysis of the image data. As one example, the processor can digitally process the image data to determine the number and size of leaves, calculate the leaf-area index (LAI), determine the size and number of fruits or flowers, and perform segmentation and other digital phenotyping processes based on the analyzed image data.

In these embodiments, the analyzed data can be compared to a database of representative plant type and growth stage characteristics, or to previously stored plant data (e.g., as discussed below with respect to operation 1050), or other data stored in memory associated with the processor. As another example, the processor can analyze the image data to determine plant health (e.g., areas in which the plant is thriving or demanding more attention). The image data can also be analyzed to assess the presence of insects, pests, rust, mold, blight, fungus, infections or plant diseases. In embodiments where the image data includes indicia (e.g., on the pod), the indicia can be analyzed to determine plant type. For example, the processor can determine the plant type by looking up the indicia in a database accessed over the internet, in the cloud, or via another network, or an indicia database can be stored in local memory, or both local and remote databases can be used, where the indicia is associated with a plant type and other plant-specific information such as growth cycles and associated watering schedules, recommended nutrients, lighting levels, and pest or disease indicators, etc.

After operation 1020, the method 1000 can proceed to operation 1025 in which the plant type, health, and/or growth stage is transmitted to a user device. For example, the user device can include application software configured to receive the information on plant type, health, and/or growth stage from the processor and display through a data interface the information to the user. A user may determine, based on the plant data received, that an adjustment to the lighting assembly or pump is desirable. In some examples, the user may provide feedback through the user device to the processor to adjust the lighting assembly and/or pump operation. In additional examples, any such user feedback may also be applied and analyzed by the processor in order to override automated adjustments to the lighting assembly and pump operation; e.g., as discussed below with respect to operations 1030 and 1040, respectively.

After operation 1020, the method 1000 can also proceed to operation 1030 in which a lighting assembly is adjusted based on one or more of plant type, health, growth stage, and/or ambient condition. As one example, a certain plant type may require or benefit from exposure to light for a longer or shorter duration, or at higher or lower intensity, in a particular spectral range, or the like, and the light assembly can be controlled or adjusted accordingly based on the lighting needs of the particular plant. In these examples, the processor or controller can also determine whether the ambient light exposure is suitable or optimal for a particular plant or plant type based on ambient light condition data received from an ambient light sensor, and the processor/controller adjust the lighting assembly to account for the ambient light condition.

As described herein, the lighting assembly can include a plurality of lighting elements in data communication with the processor. The lighting elements can include one or more white lighting elements, red lighting elements, yellow lighting elements, green lighting elements, blue lighting elements, infrared lighting elements, or ultraviolet lighting elements, or a plurality of such lighting elements, or any combination thereof. In some particular embodiments, the lighting elements can include one to one and a half times or more white lighting elements as compared to red lighting elements, and up to twice as many or more red lighting elements as compared to blue lighting elements.

Adjusting the lighting assembly can include activating and deactivating (or otherwise controlling) the plurality of lighting elements together, or modulating individual lighting elements or groups of lighting elements to independently adjust one or both of the lighting spectrum and intensity. Alternatively or additionally, adjusting the lighting assembly can include transmitting, by the processor, instructions to an actuator to adjust a height of the lighting assembly relative to the one or more plants based on one or more of the plant type, plant health, growth stage, and ambient condition. In this example, the actuator is in data communication with the processor and can be coupled to an adjustable support that supports the lighting assembly; e.g., where adjusting the height of the lighting assembly includes adjusting, by the actuator, a length of the adjustable support.

After operation 1030, the method 1000 can proceed to operation 1040, in which operation of a pump is adjusted or controlled based on one or more of plant type, health, growth stage, and/or ambient lighting, temperature, humidity, and other conditions. For example, the pump or pump assembly can be configured to distribute a water or nutrient solution (or other fluid) from a fluid reservoir to the one or more plants for irrigating the one or more plants. The pump can distribute fluid to the one or more plants according to an irrigation schedule, which can be adjusted based on one or more of the plant type, health, growth stage, and/or ambient condition.

For example, the pump on time, off time and other pump cycle time parameters can be selected based on a plant-type specific irrigation schedule, as discussed above; e.g., to provide a controlled amount of fluid from the reservoir to the one or more plants, or to provide a predetermined fluid flow to the one or more plants, for a preselected time. The pump on time, pump off time and pump cycle parameters can be varied based both on plant type or variety and on the plant growth stage, for example to provide higher levels of irrigation to water-intensive plants or during earlier periods of high growth, or both. Similarly, the pump on time, pump off time and pump cycle parameters can be varied based both on plant type or variety and on plant growth stage to provide lower levels of irrigation to less water-intensive plants or during later periods of lower growth, or both. In other examples, the pump operation may be adjusted based on fluid level data received from a fluid level sensor; e.g., to reduce fluid flow when fluid level is low, or based on temperature or humidity data received from a temperature or humidity sensor, or to increase fluid flow when temperature is high or humidity is low, etc.

After operation 1040, the method 1000 can proceed to operation 1050 in which data is stored by memory associated with the processor. For example, the data stored can include one or more of image data, ambient condition data, data on plant type, health, and growth stage, light assembly adjustments, pump operation adjustments, and the like. As discussed above with respect to operation 1020, the stored data can be used for future data analysis to assess plant type, health, and/or growth stage information, and as part of the determination of whether to adjust the lighting assembly and/or pump operation.

System Architecture

Figure 11:
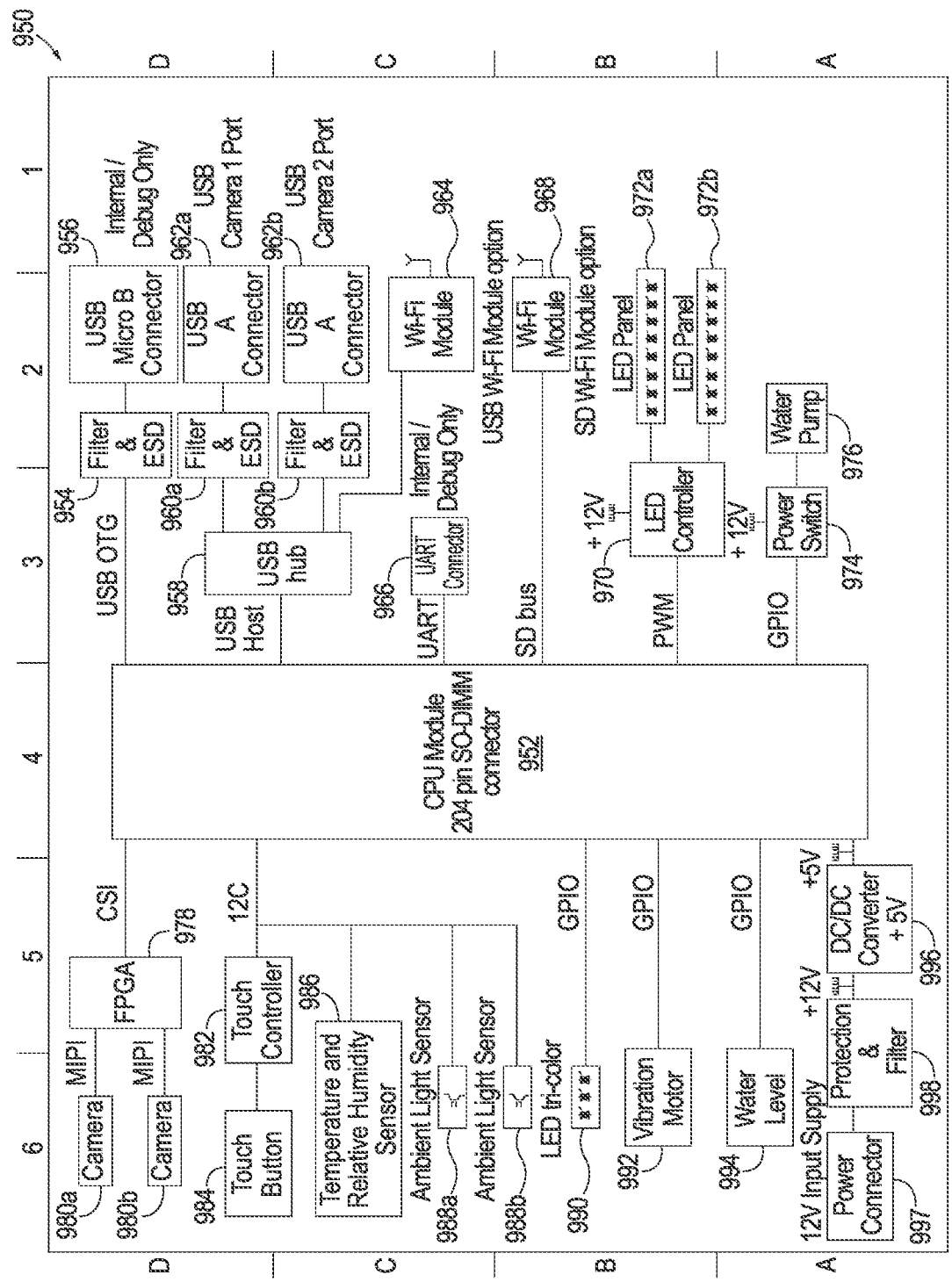
FIG. 11 is a block diagram of an automated gardening system, operable according to the disclosed gardening apparatus.

FIG. 11 is a block diagram of system architecture for a gardening system 950, for example according to an apparatus 100 or gardening system 600, as described herein. System 950 can be used for growing a variety of different plants i. As shown in FIG. 11, the system 950 includes a central processing unit (CPU) module 952. The CPU can be, for example an ARM or RISC or other suitable CPU architecture running an operating system such as Linux OS that connects to the internet via a wired or wireless connection (Wi-Fi).

An exemplary CPU module 952 is a customization of a commercial or proprietary design, with a suitable processor (for example, with an ARM or RISC core). In this particular example, the module 952 has a CPU, a power management integrated circuit (PMIC) to handle power conversion, a RESET circuit, embedded Multi-Media Controller (eMMC) for the file system and storage, and synchronous dynamic random-access memory with a high bandwidth interface (e.g., DDR3, DDR3L or LPDDR3 memory, or other suitable low-power memory components). The module can plug into a motherboard using a standard pin-type SO-DIMM connector, or other suitable coupling. For testing and debugging, two different options can be provided: a USB OTG interface via micro B connector on motherboard and UART header to get console interface. A heartbeat LED on the CPU module can be used to indicate operating system (OS) activity.

As shown in FIG. 11, the CPU module 952 is in data communication with other various components of system 950. For example, the CPU module 952 can be in communication with data connectors including but not limited to a USB Micro B Connector 956 (e.g., for standard operation or internal/debug applications). The CPU module 952 is further in communication with a USB hub 958, which includes a plurality of USB connectors; e.g., a first USB A Connector 962a that provides a first camera port, and a second USB A Connector 962b that provides a second camera port.

As shown, the USB Connectors 956, 962a,b are in communication with the CPU module 952 and USB hub 958 via Filter & ESDs 954, 960a,b, respectively, as configured to control the flow of electricity (signals and power) between the components of system 950. The USB hub 958 is also in communication with a Wi-Fi Module 964, and the CPU module 952 is also in communication with a Universal Asynchronous Receiver/Transmitter (UART) connector (e.g., for operational or internal/debug use).

As shown, the CPU module 952 is in further data communication with a Wi-Fi (wireless communication) module 968. The Wi-Fi module 968 can have a dual role: it can work as an access point for initial setup (provisioning) that allows a user to configure the system 950 for access to a local internet router, or, when the Wi-Fi module 968 is not in provisioning mode, the Wi-Fi module 968 can act as a device on the network and can connect to a Wi-Fi access point. Wi-Fi connections can be used for device setup, firmware upgrades, and to transfer sensor data and images captured by the camera to the internet server. An exemplary Wi-Fi module 968 supports 802.11b/g and n protocols; e.g., including a Bluetooth modem connected via UART.

As shown, an LED controller 970 can be provided in data communication with the CPU module 952 to control a plurality of LED panels 972a,b. For example, the LED panels 972a,b can be LED bars designed to facilitate controlled plant growth. In particular examples, the LED bar can include up to 20 or more white LEDs controlled separately in two chains, with up to ten or more red LEDs and up to four or more blue LEDs, in additional chains. The brightness of each LED chain can be controlled separately using a pulse width modulation (PWM) signal.

The height of the LED bar can be adjustable using a telescopic arm. In some embodiments, the LED bar can include a user interface. For example, user interface hardware (UI HW) can be mounted on a separate board, on top of the LED bar.

The CPU module 952 is in further data communication with a power switch 974 that controls a water pump 976 that circulates water through the gardening apparatus. For example, the water pump 976 can provide the same amount of water for each plant insert or pod, or a customized amount of water for each different insert depending on needs or growth characteristics of the plant that is in or associated with the insert. The speed of the water pump 976 can be controlled by variable voltage regulators under control by CPU 952.

The CPU 952 can also be provided in data communication with one or more cameras. As one example, the CPU can have a single camera interface (CSI). In one example, and as shown, the CPU 952 includes a Field Programmable Gate Array (FPGA) 978 to connect two or more cameras. For example, the FPGA 978 includes two camera MIPI inputs to receive image data input from a first camera 980a and a second camera 980b, and for conversion of MIPI to CSI standards.

One of the cameras 980a,b can be an internal camera used to monitor plant growth and create time lapse videos. It is also contemplated, however, that the FPGA can be omitted and the cameras 980a,b can be in direct communication with the CPU 952. Two cameras can also enable better visual coverage of the inserts and/or plants described above; however, in some embodiments, either a single camera or more than two cameras can be used. As one particular example, 2 MP and/or 5 MP cameras can be used, or other cameras with suitable resolution, power requirements, and form factor.

Images can be captured by the cameras automatically, and can be used for plant identification and other various data analysis purposes, as described herein, or to create time lapse videos. The user can also initiate image capture to verify the status of the plants used with the gardening apparatus and system 950. Images can be stored in local memory until they are transmitted to the server.

The CPU 952 can also be provided in data communication with one or more sensors adapted to measure or sense ambient and operational conditions for the system 950, for example water level, temperature, humidity, and ambient light level. As shown in FIG. 11, the CPU 952 is in communication with a temperature and relative humidity sensor 986 (which can also be provided as two separate, distinct sensors), two or more ambient light sensors 988a,b, and a water level sensor 994. In one example, the water level sensor 994 is a float and can sense at least three different levels: full (or other preselected high level), to signal to the user that more water is not required; half full (or other preselected intermediate level), warning or indicating that water should be added at a particular time; and low or critically low (or other preselected low level), where the pump cannot operate unless more water is added.

As shown, the CPU 952 is further in data communication with a user interface. For example, the user interface can be implemented as an application that connects to the gardening apparatus using Wi-Fi protocols. Settings for the user interface can also be implemented using Wi-Fi protocols.

The user interface can include a touch button 984 that provides input to a touch controller 982 in communication with the CPU 952. The touch button 984 can include a tri-color LED 990 (e.g., RGB LED or other suitable indicator) that backlights the touch button 984 and is in communication with the CPU 952, as well as a vibration motor 992 that provides haptic feedback (e.g., when the touch button 984 is pressed) and is also in communication with the CPU 952. As one example, the touch button 984 can be implemented with a capacitive touch sensor.

The system 950 can be powered by a suitable AC or DC (e.g., 5V, 6V or 12V) input supply through a power connector 997 coupled to the system 950 through a protection filter 998 and DC/DC Converter (e.g., +5V) 996. The power adapter currents can be up to 3 A or more, depending on design.

As one example, power is supplied from a standard wall adapter. The power rating can be dependent on the LEDs used with the system 950, as they can consume most of the power used by the system 950. In some examples, the source can be 12V/5 A. As another example, primary power for the motherboard can be 5V; e.g., generated by a step-down or buck DC/DC converter. Other voltages can be generated by PMIC on CPU module 952.

Both the water pump 976 and LED light controller 970 can be powered from the input (e.g., 12V) line, or with another suitable power supply. The water pump 976 power supply can include a regulated buck converter adjustable in the range of 4.5 to 12V, in order to provide variable flow control. Typical supply voltages for the LED lights can range up to about 3V or more (e.g., for white and blue LEDs), and down to about 2V or less (e.g., for red LEDs). For particular examples, one, two, three or more of the plurality (up to 10 or more) of red LEDs, as in the example discussed above, can be controlled using boost converters, while the blue LEDs may use a buck/boost converter, since their total output voltage may range to about 12V.

Examples

In various examples and embodiments, a gardening apparatus comprises one or more of a base, a fluid reservoir disposed on the base, and a growing stage or plant tray or support disposed on the reservoir. The plant tray or support is adapted for receiving one or more modular plant inserts for growing plants having one or more plant types. The gardening apparatus includes a flow structure adapted for channeling fluid to one or both of the one or more modular plant inserts (e.g., to a body portion of each modular insert) and the one or more plants.

A pump assembly can be included with the garden apparatus. The pump assembly is adapted to supply fluid flow from the fluid reservoir to the flow structure, where one or both of the plants and the modular plant inserts are supplied with the fluid according to an irrigation cycle. For example, a pump can be provided in or adjacent to the reservoir. The modular plant inserts can then be irrigated via the flow structure.

A light assembly can be included proximate the plant tray or support (e.g., above the plant tray or support), with one or more lighting elements adapted to generate a spectrum of light. The light is directed toward the plant tray, with the spectrum selected for growth of plants from the modular inserts. For example, one or both of the plants and the inserts are exposed to the light spectrum according to a light cycle.

The lighting elements can include a plurality of white lighting elements, a plurality of red lighting elements, a plurality of yellow lighting elements, a plurality of green lighting elements, a plurality of blue lighting elements, a plurality of infrared lighting elements, a plurality of ultraviolet lighting elements, or a combination thereof. The white lighting elements may provide a majority of a respective white light intensity with wavelengths between about 485 nm and about 590 nm, the red lighting elements may provide a majority of a respective red light intensity with wavelengths of about 590 nm or above, and the blue lighting elements may provide a majority of a respective blue light intensity with wavelengths of about 450 nm or below. The lighting elements can include one and a half times or more white lighting elements as compared to red lighting elements, and twice as many or more red lighting elements as compared to blue lighting elements.

The gardening apparatus can include one or more optical sensors, for example an optical light sensor or camera. The one or more optical sensors (e.g., cameras) can be disposed on the light assembly. Additionally or alternatively, the one or more optical sensors (or cameras) can be disposed on a user device. A processor in provided in data communication with the one or more optical sensors, lighting elements and pump assembly, where the processor is configured for controlling one or both of an irrigation cycle of the pump and the lighting cycle (e.g., the spectrum generated by the one or more lighting elements), based at least in part on a plant type of at least one of the plants.

The optical sensor data can also be used to adapt or change the light exposure scheduling, for example by determining a time of day based on ambient light exposure (e.g., when operating in an offline mode or without a network connection). A GPS interface or other system can also be provided for determining local time. In some examples, the optical sensor can be adapted to distinguish between natural and artificial light exposure, and the natural light exposure can be used to determine the local time of day. An interface can also be provided in communication with the processor; e.g. for communicating the plant type, growth stage information and environmental data with a mobile phone, tablet computer, or other mobile computing device.

The processor is configured to modulate one or both of the light spectrum generated by the lighting elements and the fluid flow over a periodic cycle based on the plant type; e.g., over a daily, diurnal, nocturnal, or crepuscular cycle, or a combination. The optical sensors can also be adapted to sense ambient light conditions proximate one or both of the plants and the modular inserts, with the processor being further configured to dynamically modulate one or both of the spectrum and the fluid flow based on the ambient light conditions.

Depending on application, the processor can be configured to modulate one or both of the lighting cycle (e.g., the lighting spectrum) and the irrigation cycle or schedule based at least in part on a growth cycle of the plant type. For example, the processor can be adapted to modulate one or both of the lighting spectrum and irrigation schedule over a growth cycle of at least one week, during which time the selected spectrum and pump cycle are modulated based on the plant type. The optical sensors can also be adapted to identify a stage of the growth cycle, with the processor configured to modulate one or both of the fluid flow (e.g., the pump cycle) and lighting spectrum based at least in part on the plant growth stage.

The plant growth stage can change over a period extending for at least one or more days, and the processor can adjust the light spectrum or fluid flow according to the change in the growth stage. In additional embodiments, one or both of the irrigation cycle and lighting spectrum can also be modulated based on ambient conditions, including, but not limited to, ambient light level, temperature, and humidity, and/or or based on altitude or other locational data. For example, the garden apparatus can include one or more environmental sensors adapted to sense an ambient condition (e.g., ambient temperature, ambient humidity, ambient pressure or ambient light exposure, or a combination thereof) proximate the plants, with the processor adapted to dynamically change one or both of the fluid flow and the light spectrum based on a change in the ambient condition.

In some embodiments, the one or more optical sensors comprise a camera in data communication with the processor, where the camera is adapted to generate image data representative of one or both of the modular inserts and the plants. The gardening apparatus can include an interface in data communication with the processor, where the interface is adapted for communicating the image data with a user device (e.g., a mobile device). One or more indicia can be provided on at least one of the modular inserts, where the indicia are associated with (e.g., identify) the plant type of one or more respective plants. In these examples, one or more of the optical sensors, in data communication with the processor, can be adapted to capture image data associated with the indicia, and the processor can be adapted to identify the plant type based on optical recognition of the indicia. The gardening apparatus can also include a data interface in data communication with the processor, with the data interface adapted for communicating the plant type with a user device.

An adjustable support can be coupled to the base to support the light assembly, and can be adapted to adjust a height of the lighting elements relative to the plant tray or support. The support may be manually adjustable or an actuator can be coupled to the adjustable support, in data communication with the processor, for example with the actuator being adapted to adjust the height of the one or more lighting elements based at least in part on the plant type or growth stage, or both.

The gardening apparatus can include a fluid level sensor adapted to sense a level of the fluid in the fluid reservoir. In this example, the fluid level sensor can be in data communication with the processor and the processor can be adapted to dynamically modulate one or both of the light spectrum and the fluid flow based on a change in the level of the fluid. The gardening apparatus can also include a data interface in communication with the processor, with the data interface adapted to communicate information representative of the level of the fluid to a user device (e.g., a mobile device). The processor can be adapted to modulate the fluid flow to achieve the irrigation cycle according to a recipe or algorithm selected for the one or more plant types, and further to dynamically change the irrigation cycle responsive to a change in the level of the fluid and/or a change in the growth stage of the plants.

In some embodiments, the processor can be adapted to dynamically modulate one or both of the light spectrum and the fluid flow based a recipe or algorithm selected for the one or more plant types, the recipe or algorithm comprising one or more control indicators or scheduling parameters adapted for changing the light spectrum or fluid flow as described herein. The one or more control indicators or scheduling parameters can be selected from a light on or off time; a white, red, green, yellow, blue, infrared or ultraviolet intensity; a white, red, yellow, green, blue, infrared or ultraviolet light on or off indicator; a pump on or off time; or a pump cycle time.

In some embodiments, the processor is adapted to modulate the fluid flow and light spectrum to achieve the irrigation cycle and the light cycle according to a recipe or algorithm selected for the one or more plant types, as described herein. In this example, the processor can be further adapted to dynamically change one or both of the irrigation cycle and the light cycle according to a change in a growth stage of the one or more plant types. The change in the growth stage can be selected from germination of the one or more plant types, a change in height or size of the one or more plant types, branching of the one or more plant types, leafing out of the one or more plant types, and flowering of the one or more plant types.

The processor can further be adapted to dynamically change the irrigation cycle or the light cycle according to one or more control indicators or scheduling parameters, as described herein. For example, the one or more control indicators or scheduling parameters can be selected from ambient temperature, ambient humidity, ambient pressure, or ambient light exposure, or a combination thereof. As another example, the one or more control indicators or scheduling parameters can be selected from an exposure time for exposure of one or both of the plants and plant inserts to the light spectrum; e.g., using a light on, off, brighten or dim indicator describing a change in a spectral profile of the light spectrum to which one or both of the plants and inserts are exposed. Other suitable control indicators and scheduling parameters include a light intensity indicator describing a change in intensity of the light spectrum to which one or both of the plants and inserts are exposed.

In other examples, one or more control indicators or scheduling parameters can be selected from a pump on or off time or pump cycle time; e.g., as selected for controlling operation of the pump assembly to supply the fluid flow from the reservoir to a flow structure. The flow structure can include one or more flow channels adapted to direct the fluid flow to a body portion of the one or more inserts. The one or more flow channels can be defined between first and second levels of the plant support or tray, and further include a flow line connecting the pump assembly to a pump inlet opening into one or more of the flow channels. The flow structure can include a nozzle connected to the pump apparatus by a flow line, with the nozzle adapted to direct the fluid flow to one or more of the plants by spraying, misting or fogging.

In some embodiments, the processor can be configured to identify the one or more plant types by digital processing of the image data generated by the camera. Digital processing can include digital phenotyping analysis of the image data generated by the camera. In this example, the processor can be further configured to identify a growth stage of the one or more plant types by the phenotyping analysis of the image data generated by the camera. The processor can be further configured to dynamically change the irrigation cycle or light cycle based on the plant type and plant growth stage. In some embodiments, the camera can have processing capabilities to analyze the image data. For example, the camera can be configured to non-destructively analyze one or more plants by employing machine vision through an RGB, black and white, IR or hyperspectral camera, or by multispectral imaging technology.

In some embodiments, the processor can be configured to generate a growth stage indicator based on digital analysis of the image data generated by the camera. The growth stage indicator can be selected from germination of one or more of the plants from the inserts, branching or leafing out of one or more of the plants, flowering of one or more of the plants, and growth of fruit on one or more of the plants. The processor can be configured to generate a harvest indicator based at least in part on the plant growth stage indicator, the harvest indictor representing a selected time period for harvesting one or more of the plants, or a portion thereof.

The gardening apparatus can include a data interface in communication with the processor, with the data interface adapted for communicating the harvest indicator with a user device. In some embodiments, the user device can include an application for collecting a user's post-harvest feedback, and the post-harvest feedback can be used by artificial intelligence software or other suitable software to predict, select, promote or suggest one or more plant pod pack orders by or for the use, responsive to the feedback. In some embodiments, the processor can be further configured to identify a pest, infection, disease, blight or fungus on one or more of the plants, based on digital processing of the image data generated by the camera.

In some embodiments, the gardening apparatus can include one or more sensors in data communication with the processor, and the processor can be configured to collect sensor and/or imagery data on individual plants to be stored in a database of historical plant growth and maturation behavior and outcomes. Suitable sensors include, but are not limited to, digital cameras, light sensors, temperature sensors, humidity sensors, pressure sensors, and fluid level sensors.

In some embodiments, the gardening apparatus includes a data interface configured for data communications between the processor and a user device. In some of these embodiments, the processor can be configured to determine an elapsed time between user interactions via the data interface and to modulate one or both of the spectrum and the fluid flow according to a default or offline mode, based on the elapsed time. In additional embodiments, the processor can be configured to modulate one or both of the spectrum and fluid flow according to user instructions received via the interface. In these embodiments, the processor can be adapted to modulate the spectrum or fluid flow according to two or more recipes, algorithms, control indicators or scheduling parameters selected for growing the plants with different colors, different tastes, or different odors, as described herein.

In some embodiments, the gardening apparatus can include a pump assembly disposed in or on the reservoir and a wireless power connection between the pump and a power connector disposed in the base, or between the pump and a power liner or power bus connecting the processor and the light assembly. In some of these embodiments, the pump, reservoir and plant tray or support are removable from and replaceable on the base together as a unit, without draining the fluid from the reservoir. In additional embodiments, the reservoir and plant tray or support are separable and adapted for machine cleaning in a residential dishwasher, when removed from the base.

In some embodiments, a system for growing plants can include a gardening apparatus as described herein. In other embodiments, a method for growing plants is disclosed that includes operating a gardening apparatus or system as described herein. In further embodiments, a non-transitory, computer readable medium having program code stored thereon is disclosed, with the program code executable on a computer processor to operate the system or to perform the method for growing plants. In some of these embodiments, the system is networked for operating the automated gardening system or apparatus in communication with one or more user devices, as described herein.

The technology described here can also be implemented as logical operations and/or modules in one or more systems. The logical operations can be implemented as a sequence of processor implemented steps directed by software programs executing in one or more computer systems and as interconnected machine or circuit modules within one or more computer systems, or as a combination of both. Likewise, the descriptions of various component modules can be provided in terms of operations executed or effected by the modules. The resulting implementation is a matter of choice, dependent on the desired performance of the underlying system implementing the technology described here. Accordingly, the logical operations making up the embodiments described herein are referred to variously as operations, steps, objects, or modules. Furthermore, it should be understood that the disclosed logical operations can be performed in any order, and these logical operations can be used in any combination with one or more steps omitted and/or one or more additional steps added.

In some implementations, the articles of manufacture described herein are provided as or with computer program products that cause the execution of operations on a computer system to implement the corresponding procedural operations. One particular implementation of such a computer program product is provided as a non-transitory computer program storage medium readable by a computer system, and encoding a computer program that can be executed on a computer process to implement the techniques described herein. It should further be understood that the technology described here can be employed in special purpose devices, either together with or independent of a personal computer, mobile phone, table, or other user device.

While this invention has been described with reference to exemplary embodiments, it will be understood by those skilled in the art that various changes can be made and equivalents may be substituted, without departing from the spirit and scope of the invention. In addition, modifications may be made to adapt the teachings of the invention to particular situations and to use other materials, without departing from the essential scope thereof. The invention is thus not limited to the particular examples that are disclosed here, but encompasses all of the embodiments falling within the scope of the claims.

The invention claimed is:

1. A gardening apparatus comprising:
a fluid reservoir disposed on or adjacent a base;
a plant support disposed on the fluid reservoir, the plant support adapted for receiving one or more inserts for growing one or more plants having one or more plant types;
a flow structure configured for channeling fluid to one or both of the one or more plants and the one or more inserts;
a pump assembly adapted to supply fluid flow from the fluid reservoir to the flow structure,
wherein one or both of the one or more plants and the one or more inserts are supplied with the fluid according to an irrigation cycle;
a light assembly proximate the plant support, the light assembly having one or more lighting elements adapted to generate a light spectrum selected for growth of the one or more plants from the one or more inserts, wherein one or both of the plants and the inserts are exposed to the light spectrum according to a lighting cycle; and
a processor in communication with the pump assembly and the lighting elements, wherein
the processor is adapted to control one or both of the irrigation cycle and the lighting cycle based at least in part on the one or more plant types;
wherein the pump assembly is disposed in or on the fluid reservoir and further comprising a wireless power connection between the pump assembly and a power connector disposed in the base, or between the pump assembly and a power line or power bus connecting the processor and the light assembly.

2. The gardening apparatus of claim 1, wherein the processor is configured to modulate one or both of the light spectrum and the fluid flow over a periodic cycle based on one or more of the following:
the one or more plant types and a growth stage of the one or more plant types;
a light on or off time selected for turning the lighting elements on or off for a predetermined time;
a white, red, green, yellow, blue, infrared or ultraviolet intensity selected for changing the light spectrum;
a white, red, yellow, green, blue, infrared or ultraviolet light on or off indicator selected for turning on or off a selected subset of the lighting elements, independent of others of the lighting elements;
an exposure time selected for exposure of one or more of the plants or inserts to the light spectrum for a predetermined time;
a light on, off, brighten or dim indicator describing a change in a spectral profile of the light spectrum to which one or more of the plants or inserts are exposed;
a light intensity indicator describing a change in intensity of the light spectrum to which one or more of the one or more plants and one or more inserts are exposed; and
a pump on or off time or pump cycle time selected for controlling operation of the pump assembly to supply the fluid flow from the fluid reservoir to the flow structure;
wherein the periodic cycle comprises a daily, diurnal, nocturnal or crepuscular cycle, or a combination thereof.

3. The gardening apparatus of claim 1, further comprising:
a camera in data communication with the processor, wherein the camera is adapted to generate image data representative of an image or video of one or more of the inserts or plants; and
an interface in data communication with the processor, wherein the interface is adapted for communicating the image data with a user device.

4. The gardening apparatus of claim 3, wherein the processor is configured to identify one or more of the plant type, a growth stage, and plant health by digital processing of the image data generated by the camera.

5. The gardening apparatus of claim 4, wherein the digital processing comprises digital phenotyping analysis of the image data and the processor is further configured to identify at least one of the plant type, the growth stage, and the plant health of the one or more plant types by the phenotyping analysis of the image data generated by the camera.

6. The gardening apparatus of claim 5, wherein:

the growth stage changes over a period extending for at least one or more days and a change in the growth stage is selected from germination of the one or more plant types, a change in height or size of the one or more plant types, branching of the one or more plant types, leafing out of the one or more plant types, flowering of the one or more plant types, and growth of fruit on the one or more plant types; or the processor is further adapted to change the light spectrum or fluid flow responsive to one or both of the plant health and the change in the growth stage, and/or to store the image data in a database representative of historical growth, maturation or growth outcome of the one or more plants.

7. The gardening apparatus of claim 3, wherein the processor is further configured to generate a harvest indicator or measure a maturation rate of one or more of the plants based at least in part on the respective growth stage, the harvest indictor or maturation rate representing a selected time period for harvesting or maturation of one or more of the plants, or a portion thereof, wherein the interface in data communication with the processor is adapted for communicating the harvest indicator or plant maturation rate with a user device.

8. The gardening apparatus of claim 3, wherein the camera is configured to non-destructively analyze one or more of the plants by employing machine vision through an RGB, black and white, IR or hyperspectral camera, or by multispectral imaging technology.

9. The gardening apparatus of claim 3, wherein the processor is configured to identify a pest, infection, disease, blight or fungus on one or more of the plants, based on the digital processing of the image data generated by the camera.

10. The gardening apparatus of claim 3, further comprising an indicia on at least one of the inserts, wherein the indicia is associated with the at least one plant type, wherein the camera is configured to capture an image of the indicia for representation in the image data and the processor is configured to identify the at least one plant type based on optical recognition of the indicia as represented in the image data.

11. The gardening apparatus of claim 10, wherein the camera is disposed on the light assembly or provided on a user device, and the interface in data communication with the processor is adapted for communicating the plant type with the user device.

12. The gardening apparatus of claim 1, further comprising one or more environmental sensors in data communication with the processor and adapted to sense an ambient condition proximate the one or more plants, wherein:

the one or more environmental sensors comprise an optical sensor adapted to sense ambient light exposure proximate the one or more plants, a temperature sensor adapted to sense ambient temperature proximate one or more of the plants, a humidity sensor adapted to sense ambient humidity proximate one or more or the plants, a pressure sensor adapted to sense ambient pressure proximate one or more of the plants, or a combination thereof; and/or the processor is adapted to change one or both of the fluid flow and the light spectrum based on a change in the ambient condition.

13. The gardening apparatus of claim 1, wherein the flow structure comprises:

one or more flow channels adapted to direct the fluid flow to a body portion of the one or more inserts, wherein the one or more flow channels are defined between first and second levels of the plant support or connected to a flow line connecting the pump assembly to a pump inlet opening into one or more flow channels; or a nozzle connected to the pump assembly by a flow line, the nozzle adapted to direct the fluid flow to one or more of the plants by spraying, misting or fogging.

14. The gardening apparatus of claim 1, further comprising a fluid level sensor in data communication with the processor and adapted to sense a level of the fluid in the fluid reservoir, wherein:

the processor is adapted to modulate one or both of the light spectrum and the fluid flow for all of the plants or for a selected subset of the plants, independent of others of the plants, based on a change in the level of the fluid; or further comprising a data interface in communication with the processor, wherein the data interface is adapted to communicate information representative of the level of the fluid with a user device.

15. The gardening apparatus of claim 1, further comprising an adjustable support coupled to the base and supporting the light assembly; and an actuator coupled to the adjustable support and in data communication with the processor, wherein the actuator is adapted to adjust the height of the one or more lighting elements based at least in part on the at least one plant type.

16. The gardening apparatus of claim 1, wherein the lighting elements comprise:

a plurality of yellow lighting elements, a plurality of green lighting elements, a plurality of infrared lighting elements, a plurality of ultraviolet lighting elements, or a combination thereof; or a plurality of white lighting elements, a plurality of red lighting elements, and a plurality of blue lighting elements, wherein the white lighting elements provide a majority of a respective white light intensity with wavelengths between about 485 nm and about 590 nm, the red lighting elements provide a majority of a respective red light intensity with wavelengths of about 590 nm or above, and the blue lighting elements provide a majority of a respective blue light intensity with wavelengths of about 450 nm or below, and wherein the lighting elements comprise one and a half times or more of the white lighting elements as the red lighting elements, and twice as many or more red lighting elements as the blue lighting elements.

17. The gardening apparatus of claim 1, further comprising a data interface configured for data communications between the processor and a user device configured with an application executable for collecting user feedback on growth of the one or more plants from a user, and for predicting, suggesting or selecting one or more orders for additional inserts responsive to the user feedback.

18. The gardening apparatus of claim 17, wherein the feedback comprises image data representative of one or more of the plants or information responsive to harvesting, maturation or demise of one or more of the plants, and wherein the application is configured to execute artificial intelligence or machine learning code to predict the one or more orders by or for the user.

19. The gardening apparatus of claim 1, further comprising a data interface configured for data communications between the processor and a user device, wherein the processor is configured to:
   determine an elapsed time between user interactions via the data interface and to modulate one or both of the light spectrum and the fluid flow based on the elapsed time;
   modulate one or both of the light spectrum and fluid flow according to user instructions received via the data interface; and/or
   modulate the light spectrum or fluid flow according to scheduling parameters selected for growing the plants with different colors, different tastes, or different odors.

20. The gardening apparatus of claim 1, wherein:
   the pump assembly, fluid reservoir and plant support are removable from and replaceable on the base together as a unit, without draining the fluid from the fluid reservoir; or
   the fluid reservoir and plant support are separable and adapted for machine cleaning in a residential dishwasher, when removed from the base.

21. The gardening apparatus of claim 1, wherein the wireless power connection is contactless or inductive.

22. The gardening apparatus of claim 1, wherein the wireless power connection is sealed, waterproof, or configured for preventing leakage of the fluid when the fluid reservoir is removed from the base.

23. A method for operating a gardening apparatus according to claim 1, the method comprising:
   providing the gardening apparatus of claim 1,
   receiving image data from a camera, the image data representative of one or more of the plants or inserts,
   analyzing the image data to determine one or more of the plant types and/or a growth stage of one or more of the plants; and
   controlling one or both of the pump assembly and the light assembly;
   wherein the pump assembly is configured to supply the fluid flow to one or more of the plants based on one or both of the one or more determined plant types and/or the growth stage; or
   wherein the light assembly is configured to expose one or more of the plants to the light spectrum based on one or both of the one or more determined plant types and/or the growth stage.

24. The method of claim 23, further comprising receiving ambient condition data from one or more sensors and modulating one or both of the fluid flow or light spectrum based on the ambient condition data, wherein the ambient condition data is representative of temperature, pressure, humidity or light exposure proximate one or more of the plants, or a fluid level of the fluid in the fluid reservoir, or a combination thereof.

25. The method of claim 23, further comprising activating, deactivating or controlling a brightness of one or more of the lighting elements to modulate an intensity or color of the light spectrum.

26. The method of claim 23, further comprising controlling an actuator to adjust a height of the light assembly relative to one or more of the plants based the one or more determined plant types or the growth stage, or both.

27. The method of claim 23, wherein the image data are representative of indicia provided on one or more of the inserts, and further comprising analyzing the image data representing the indicia to identify one or more of the plant types.

28. The method of claim 23, further comprising transmitting one or more of the one or more determined plant types, the growth stage and/or the image data to user device via a data interface, and:
   modulating one or both of the light spectrum and fluid flow according to user instructions received via the data interface;
   determining an elapsed time between user interactions via the data interface and modulating one or both of the light spectrum and the fluid flow based on the elapsed time; and/or
   modulating the light spectrum or fluid flow according to scheduling parameters selected for growing the plants with different colors, different tastes, or different odors.

29. The method of claim 23, wherein a user device is configured with an application executable for collecting user feedback on growth of the one or more plants from a user, and further comprising:
   predicting, suggesting or selecting one or more orders for additional inserts responsive to the user feedback;
   wherein the feedback comprises image data representative of one or more of the plants or information responsive to harvesting, maturation or demise of one or more of the plants; and/or
   wherein the application is configured to execute artificial intelligence or machine learning code to predict the one or more orders by or for the user.

30. The method of claim 23, further comprising removing the reservoir from the base, wherein the wireless power connection is contactless, inductive, sealed or waterproof.

31. A system for growing one or more plants from one or more inserts, the system comprising:
   a camera in data communication with a processor;
   a fluid reservoir disposed on or adjacent a base, with a pump assembly adapted to supply fluid flow from the fluid reservoir to one or more of the plants or inserts;
   a light assembly with one or more lighting elements adapted to generate a light spectrum selected for growth of one or more of the plants from one or more respective inserts; and
   a processor in communication with the camera, the pump assembly, and the light assembly,
   the processor adapted for executing program code to:
   receive image data from the camera;
   analyze the image data to determine one or both of a plant type and a growth stage of one or more of the plants; and
   control operation of the pump assembly or the light assembly, or both, wherein the fluid flow or light spectrum is modulated based on the plant type or growth stage; and
   an interface in data communication with the processor, wherein the interface is configured for communicating the image data with a user device;
   wherein the pump assembly is disposed in or on the fluid reservoir and further comprising a wireless power connection between the pump assembly and a power connector disposed in the base, or between the pump assembly and a power line or power bus connecting the processor and the light assembly.

32. The system of claim 31, wherein the wireless power connection is contactless or inductive.

33. The system of claim 31, wherein the wireless power connection is sealed, waterproof, or configured for preventing leakage of the fluid when the fluid reservoir is removed from the base.

34. A gardening apparatus comprising:
a fluid reservoir disposed on or adjacent a base;
a plant support disposed on the fluid reservoir, the plant support adapted for receiving one or more inserts for growing one or more plants having one or more plant types;
a flow structure configured for channeling fluid to one or both of the one or more plants and the one or more inserts;
a pump assembly adapted to supply fluid flow from the fluid reservoir to the flow structure, wherein one or both of the one or more plants and the one or more inserts are supplied with the fluid according to an irrigation cycle;
a light assembly proximate the plant support, the light assembly having one or more lighting elements adapted to generate a light spectrum selected for growth of the one or more plants from the one or more inserts, wherein one or both of the plants and the inserts are exposed to the light spectrum according to a lighting cycle; and
a processor in communication with the pump assembly and the lighting elements, wherein the processor is adapted to control one or both of the irrigation cycle and the lighting cycle based at least in part on the one or more plant types;
a wireless power connection between the pump assembly and a power connector disposed in the base, or between the pump assembly and a power liner or power bus connecting the processor and the light assembly,
wherein the pump assembly is disposed in or on the fluid reservoir, and wherein the pump assembly, fluid reservoir and plant support are removable from and replaceable on the base together as a unit, without draining the fluid from the fluid reservoir.

35. The gardening apparatus of claim 34, wherein the wireless power connection is contactless, inductive, sealed or waterproof.

* * * * *